(12) United States Patent
Kagami et al.

(10) Patent No.: US 6,669,983 B2
(45) Date of Patent: Dec. 30, 2003

(54) MANUFACTURING METHOD OF THIN-FILM MAGNETIC HEAD WITH MAGNETORESISTIVE EFFECT ELEMENT

(75) Inventors: Takeo Kagami, Tokyo (JP); Naoki Ohta, Tokyo (JP); Tetsuya Kuwashima, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/279,125

(22) Filed: Oct. 24, 2002

(65) Prior Publication Data

US 2003/0080088 A1 May 1, 2003

(30) Foreign Application Priority Data

Oct. 25, 2001 (JP) .......................................... 2001-327747
Nov. 1, 2001 (JP) .......................................... 2001-336396
Jun. 5, 2002 (JP) .......................................... 2002-164504

(51) Int. Cl.[7] ................................................. B05D 5/12
(52) U.S. Cl. ........................ 427/130; 427/131; 427/259; 427/264; 427/265; 427/272; 427/282; 427/331; 427/402
(58) Field of Search ................................. 427/130, 131, 427/259, 264, 265, 272, 282, 331, 402

(56) References Cited

FOREIGN PATENT DOCUMENTS

| JP | 4-360009 | 12/1992 |
|---|---|---|
| JP | 5-90026 | 4/1993 |
| JP | 5-275769 | 10/1993 |
| JP | 9-129445 | 5/1997 |

*Primary Examiner*—Bernard Pianalto
(74) *Attorney, Agent, or Firm*—Burns, Doane, Swecker & Mathis, L.L.P.

(57) ABSTRACT

A manufacturing method of a thin-film magnetic head provided with an MR element includes a step of forming an MR multi-layered structure in which a current flows in a direction perpendicular to surfaces of layers of the MR multi-layered structure, on a lower electrode film, a step of depositing an insulation film on the formed MR multi-layered structure and the lower electrode film, a step of flattening the deposited insulation film until at least upper surface of the MR multi-layered structure is exposed, and a step of forming an upper electrode film on the flattened insulation film and the MR multi-layered structure.

39 Claims, 13 Drawing Sheets

MANUFACTURING METHOD OF THIN-FILM MAGNETIC HEAD WITH MAGNETORESISTIVE EFFECT ELEMENT

FIELD OF THE INVENTION

The present invention relates to a manufacturing method of a thin-film magnetic head with a magnetoresistive effect (MR) element for detecting magnetic intensity in a magnetic recording medium and for outputting a read signal.

DESCRIPTION OF THE RELATED ART

Recently, in order to satisfy the demand for higher recording density and downsizing in a hard disk drive (HDD) apparatus, higher sensitivity and larger output of a thin-film magnetic head are required. Thus, improvement in characteristics of a general giant magnetoresistive effect (GMR) head with a GMR element which is current-manufactured are now strenuously proceeding and also development of a tunnel magnetoresistive effect (TMR) head with a TMR element is energetically performed.

Because of the difference in flowing directions of their sense currents, structures of these TMR head and general GMR head differ from each other. One head structure in which a sense current flows in a direction parallel with surfaces of laminated layers as in the general GMR head is called as a current in plane (CIP) structure, whereas the other head structure in which a sense current flows in a direction perpendicular to surfaces of laminated layers as in the TMR head is called as a current perpendicular to plane (CPP) structure.

In recent years, CPP-GMR heads not CIP-GMR heads are being developed. For example, Japanese patent publication No. 05275769A discloses such a CPP-GMR head. Japanese patent publication Nos. 04360009A, 05090026A and 09129445A disclose CPP-GMR heads having anti-ferromagnetic coupling magnetic multi-layered films consisting of a plurality of magnetic layers stuck with each other via nonmagnetic layers (Cu, Ag, Au or others).

Also, provided are CPP-GMR heads with spin valve magnetic multi-layered films including such as specular type magnetic multi-layered films or dual-spin valve type magnetic multi-layered films.

Conventionally a lift-off method or a contact-hole method has been used for fabricating such CPP-GMR heads or TMR heads.

FIGS. 1a to 1f show sectional views illustrating a part of a conventional fabrication process of a CPP-GMR head by the lift-off method.

First, as shown in FIG. 1a, a lower electrode film 11 and a MR multi-layered film 12' are sequentially deposited on an insulation film 10 formed on a substrate (not shown).

Then, a photo-resist pattern 13 of a two-layers structure is formed thereon as shown in FIG. 1b, and the MR multi-layered film 12' is patterned by ion milling to obtain a MR multi-layered structure 12 as shown in FIG. 1c.

Then, an insulation film 14' is deposited thereon as shown in FIG. 1d, and the photo-resist pattern 13 is removed or lifted off to obtain a patterned insulation film 14 as shown in FIG. 1e.

Thereafter, an upper electrode film 15 is deposited thereon as shown in FIG. 1f.

In executing this lift-off method, it is necessary that no insulation film 14' deposited on the side surface of a stepped portion of the photo-resist pattern 13 is bridged over the stepped portion. Thus, in general, a T-shaped two-layers structure photo-resist pattern with an undercut is used in order to improve the lift-off performance.

However, if the amount or depth of the undercut of the photo-resist pattern 13 is small, the insulation film may be deposited on a side surface of a base 13a of the two-layers structure photo-resist pattern 13 causing occurrence of unnecessary burr around the removed photo-resist pattern. Contrary to this, if the undercut amount is large, a burr will be prevented from occurrence but the width of the base 13a of the photo-resist pattern 13 will become extremely narrow causing lost of the pattern.

Also, according to the lift-off method, a part of the insulation film 14 intruded into the undercut portion may be remained to overlap with a top surface of the MR multi-layered structure 12 as shown in FIG. 1e. Such overlapped insulation film causes ambiguity in a track width and limits fine micromachining of the track width. Since the length of each overlapped insulation film on the MR multi-layered structure is about 100 nm, it is impossible to fabricate by the lift-off method a recent TMR element or GMR element with an extremely narrow track width of 200 nm or less, such as around 100 nm.

In typical MR multi-layered structure of the TMR or GMR element, a free layer is located at a middle of the MR multi-layered structure and its width determines the track width. Therefore, if the MR multi-layered structure is formed by ion milling using the conventional photo-resist mask, the bottom of the MR multi-layered structure will widen causing an effective track width to increase. It is desired that the side surface of the MR multi-layered structure is perpendicular to the substrate surface and this may be implemented by an ion milling method using a hard mask or by a reactive ion etching (RIE) method. However, in principal, such methods cannot be utilized in the lift-off method.

FIGS. 2a to 2g show sectional views illustrating a part of a conventional fabrication process of a CPP-GMR head by the contact-hole method.

First, as shown in FIG. 2a, a lower electrode film 21 and a MR multi-layered film 22' are sequentially deposited on an insulation film 20 formed on a substrate (not shown).

Then, a photo-resist pattern 23 is formed thereon as shown in FIG. 2b, and the MR multi-layered film 22' is patterned by ion milling to obtain a MR multi-layered structure 22 as shown in FIG. 2c.

Then, after the photo-resist pattern 23 is removed, an insulation film 24' is deposited thereon as shown in FIG. 2d.

Then, as shown in FIG. 2e, a photo-resist pattern 26 with an opening 26a located at a contact hole is formed on the insulation film 24'.

Then, as shown in FIG. 2f, the insulation film 24' is patterned by ion milling to obtain an insulation film 24 provided with a contact hole 24a on the MR multi-layered structure 22, and thereafter the photo-resist pattern 26 is removed.

After that, an upper electrode film 25 is deposited thereon as shown in FIG. 2g.

According to this contact-hole method, however, since two photo processes with respect to the photo-resist patterns are executed, the amount of the overlap due to a deviation between both the alignments will become about 30 nm. Such overlap amount of the insulation film cannot be negligible as well as in case of the lift-off method.

As aforementioned, according to the conventional manufacturing method, it is quite difficult to fabricate a GMR head with the CPP structure or a TMR head having a very narrow track width of 200 nm or less, and therefore it has been demanded to provide a novel fabrication method capable of fabricating such CPP-GMR head or TMR head with the extremely narrow track width.

SUMMARY OF THE INVENTION

It is therefore an object of the present invention to provide a manufacturing method of a thin-film magnetic head with an MR element, whereby an MR element with a structure in which a sense current flows in a direction perpendicular to surfaces of laminated layers and with a track width of 200 nm or less can be easily manufactured.

According to the present invention, a manufacturing method of a thin-film magnetic head provided with an MR element includes a step of forming an MR multi-layered structure in which a current flows in a direction perpendicular to surfaces of layers of the MR multi-layered structure, on a lower electrode film, a step of depositing an insulation film on the formed MR multi-layered structure and the lower electrode film, a step of flattening the deposited insulation film until at least upper surface of the MR multi-layered structure is exposed, and a step of forming an upper electrode film on the flattened insulation film and the MR multi-layered structure.

Without using a lift-off method, an insulation film is deposited on the MR multi-layered structure and the lower electrode film, and then this insulation film is flattened until at least the upper surface of the MR multi-layered structure is exposed or appeared to form a flattened insulation film on and around the MR multi-layered structure.

Since a normal resist pattern or a hard mask with a straightly shaped side surface but no inversely tapered side surface can be used according to this method, more a finely micromachined MR multi-layered structure than that fabricated by using the lift-off method can be formed.

Also, since an RIE method or a hard mask that will prevent widening of the bottom of the MR multi-layered structure can be utilized for milling the MR multi-layered structure, a very precise shape of the MR multi-layered structure can be expected.

Furthermore, because no burr nor overlap of the insulation film will occur and thus a very strict track width can be defined, it is possible to easily fabricate an MR element with a structure in which a sense current flows in a direction perpendicular to surfaces of laminated layers and with an extremely narrow track width of 200 nm or less.

It is preferred that the forming step of the MR multi-layered structure includes depositing a MR multi-layered film on the lower electrode film, forming a mask on the deposited MR multi-layered film, patterning the deposited MR multi-layered film using the formed mask, and removing the mask to form the MR multi-layered structure.

It is also preferred that the forming step of the MR multi-layered structure includes depositing a MR multi-layered film on the lower electrode film, forming a mask on the deposited MR multi-layered film, and patterning the deposited MR multi-layered film using the formed mask to form the MR multi-layered structure, the mask being remained to use as a cap layer of the MR multi-layered structure.

It is further preferred that the flattening step includes executing a low angle ion beam etching (IBE) that uses a beam having a low incident angle with surfaces of laminated films.

Also, it is preferred that the flattening step includes executing a low angle IBE that uses a beam having a low incident angle with surfaces of laminated films, and executing a low rate IBE with a low etching rate.

It is further preferred that the flattening step includes executing a low angle IBE that uses a beam having a low incident angle with surfaces of laminated films, executing a flattening process using gas clusters ion beam (GCIB), and executing a low rate IBE with a low etching rate.

It is preferred that the low incident angle in the IBE is 0 to 40 degrees.

It is also preferred that the flattening step includes executing a flattening process using GCIB, and executing a low rate IBE with a low etching rate.

It is further preferred that the flattening step includes executing a chemical mechanical polishing (CMP). In this case, preferably the method further includes a step of forming a contact hole on the insulation film on the MR multi-layered structure before executing the flattening step.

It is preferred that termination of the flattening step is managed by monitoring a flattening step time or by executing endpoint detection. The endpoint detection may be executed by using a secondary ion mass spectroscopy (SIMS).

It is also preferred that the MR multi-layered structure is a TMR multi-layered structure, a CPP-GMR multi-layered structure, a TMR multi-layered structure with a bias layer for defining a magnetization direction of a free layer in the TMR multi-layered structure, or a CPP-GMR multi-layered structure with a bias layer for defining a magnetization direction of a free layer in the CPP-GMR multi-layered structure.

According to the present invention, also, a manufacturing method of a thin-film magnetic head provided with a MR element includes a step of forming an MR multi-layered structure in which a current flows in a direction perpendicular to surfaces of layers of the MR multi-layered structure, on a lower electrode film, a step of depositing an insulation film on a cover film formed on an upper surface of the formed MR multi-layered structure and the lower electrode film, a step of removing the deposited insulation film on the cover film formed on the MR multi-layered structure until the cover film is exposed or before the cover film is exposed by executing CMP, and a step of forming an upper electrode film on the cover film or the MR multi-layered structure and the insulation film.

Without using a lift-off method, an insulation film is deposited on the MR multi-layered structure and the lower electrode film, and then this insulation film is removed by CMP until or before a cover film on the upper surface of the MR multi-layered structure is exposed or appeared to form an insulation film on and around the MR multi-layered structure.

Since a normal resist pattern or a hard mask with a straightly shaped side surface but no inversely tapered side surface can be used according to this method, more a finely micromachined MR multi-layered structure than that fabricated by using the lift-off method can be formed.

Also, since an RIE method or a hard mask that will prevent widening of the bottom of the MR multi-layered structure can be utilized for milling the MR multi-layered structure, a very precise shape of the MR multi-layered structure can be expected.

Furthermore, because no burr nor overlap of the insulation film will occur and thus a very strict track width can be defined, it is possible to easily fabricate an MR element with a structure in which a sense current flows in a direction perpendicular to surfaces of laminated layers and with an extremely narrow track width of 200 nm or less.

In addition, when the insulation film is deposited, a recess may be produced around the MR multi-layered structure. Thus, a part of the deposited upper electrode film will enter the recess and a magnetic field passing through this electrode film part will be applied to the MR multi-layered structure causing its MR characteristics to deteriorate. However, according to the present invention, since the recess is removed by CMP, it is possible to improve MR characteristics.

It is preferred that the forming step of the MR multi-layered structure includes depositing a MR multi-layered film on the lower electrode film, forming a mask on the deposited MR multi-layered film, and patterning the deposited MR multi-layered film using the formed mask to form the MR multi-layered structure.

It is also preferred that the cover film is the formed mask. In this case, the removing step includes removing the deposited insulation film on the mask formed on the MR multi-layered structure until a part of the mask is removed by executing the CMP, and removing remained part of the mask is removed after the CMP.

It is further preferred that the forming step of the MR multi-layered structure includes depositing sequentially a MR multi-layered film and a first CMP stop film on the lower electrode film, forming a mask on the deposited first CMP stop film, and patterning the deposited first CMP stop film and the deposited MR multi-layered film using the formed mask to form the MR multi-layered structure.

It is preferred that the cover film is the first CMP stop film.

It is also preferred that the method further includes a step of depositing a second CMP stop film on the deposited insulation film.

It is further preferred that the removing step includes removing the deposited insulation film on the first CMP stop film formed on the MR multi-layered structure until the first CMP stop film is exposed by executing the CMP.

It is more preferred that the method further includes a step of removing the first and second CMP stop films after the CMP.

It is further preferred that the forming step of the MR multi-layered structure includes depositing sequentially a MR multi-layered film and a milling stop film on the lower electrode film, forming a mask on the deposited milling stop film, and patterning the deposited milling stop film and the deposited MR multi-layered film using the formed mask to form the MR multi-layered structure.

Preferably, the cover film is the milling stop film.

It is preferred that the removing step includes removing the deposited insulation film on the milling stop film formed on the MR multi-layered structure before the milling stop film is exposed by executing the CMP.

It is further preferred that the method further includes a step of removing the insulation film on the milling stop film by milling after the CMP, the milling stop film being remained.

Preferably, the CMP is a precise CMP with a low lapping rate for remaining a low height difference. A lapping rate of the precise CMP is preferably 50 nm/min or less.

It is preferred that the precise CMP is executed using a slurry consisting of one of colloidal silica, cerium oxide, corundum, boron nitride, diamond, chromium oxide, iron oxide, fumed silica, alumina and zeolite, or of a mixture containing one of colloidal silica, cerium oxide, corundum, boron nitride, diamond, chromium oxide, iron oxide, fumed silica, alumina and zeolite.

It is further preferred that the precise CMP is executed using a slurry with an average particle diameter of 100 nm or less.

It is also preferred that termination of the CMP is managed by monitoring a polishing process time.

It is further preferred that the MR multi-layered structure is a tunnel MR multi-layered structure or a CPP-GMR multi-layered structure.

Further objects and advantages of the present invention will be apparent from the following description of preferred embodiments of the invention as illustrated in the accompanying drawings.

DESCRIPTION OF THE PREFERRED EMBODIMENTS

FIGS. 3a to 3f illustrate a part of a fabrication process of a TMR head or a CPP-GMR head as a preferred embodiment according to the present invention.

Figure 1A:
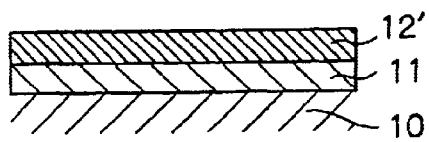
FIGS. 1a to 1f already disclosed show sectional views illustrating a part of a conventional fabrication process of a CPP-GMR head by a lift-off method.
Figure 1B:
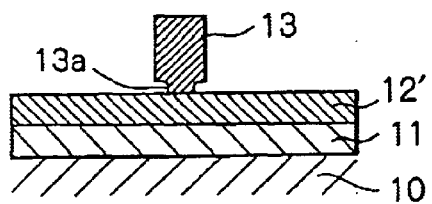
Figure 1C:
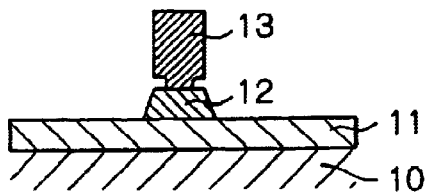
Figure 1D:
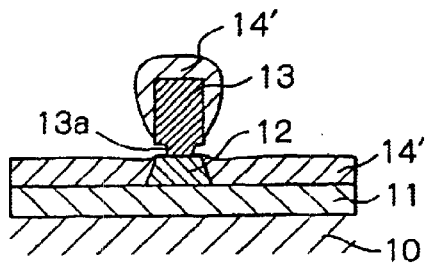
Figure 1E:
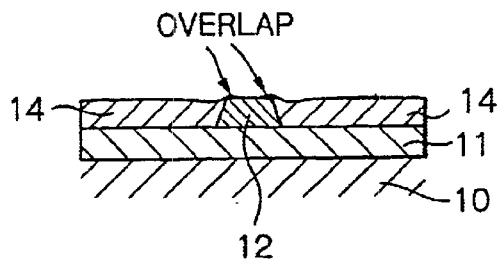
Figure 1F:
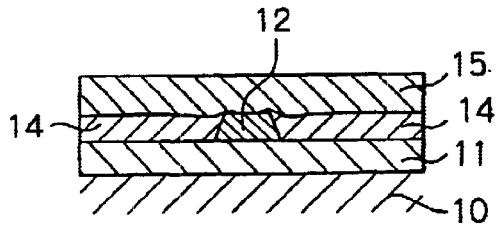
Figure 2A:
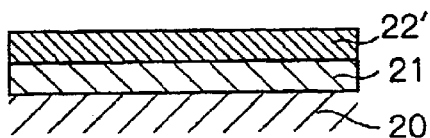
FIGS. 2a to 2g already disclosed show sectional views illustrating a part of a conventional fabrication process of a CPP-GMR head by a contact-hole method.
Figure 2B:
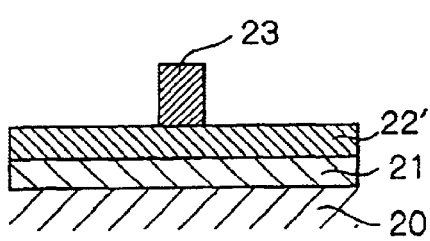
Figure 2C:
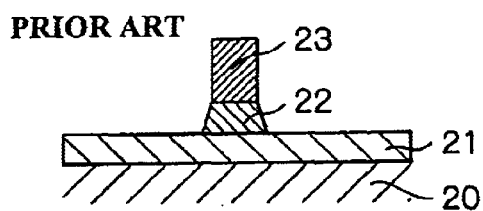
Figure 2D:
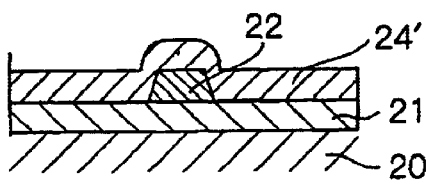
Figure 2E:
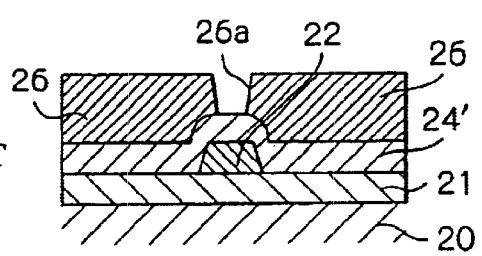
Figure 2F:
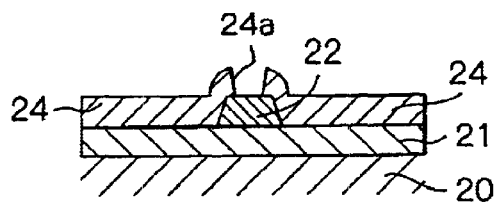
Figure 2G:
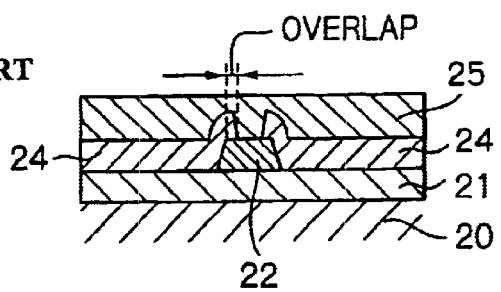
Figure 3A:
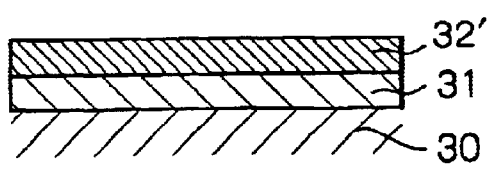
FIGS. 3a to 3f show sectional views illustrating a part of a fabrication process of a TMR head or a CPP-GMR head as a preferred embodiment according to the present invention.

First, as shown in FIG. 3a, a lower electrode film 31 which also functions as a magnetic shield film and a MR multi-layered film 32' are sequentially deposited on an insulation film 30 formed on a substrate (not shown).

Figure 3B:
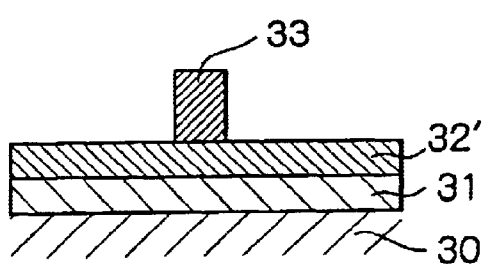

Then, a photo-resist pattern 33 with a straight shaped side wall is formed thereon as shown in FIG. 3b.

Figure 3C:
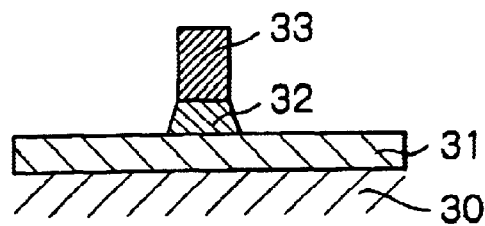

Then, the MR multi-layered film 32' with a thickness of about 35–55 nm is patterned by IBE, RIE, reactive ion beam etching (RIBE) or sputtering using the photo-resist pattern 33 as a mask to obtain a MR multi-layered structure 32 as shown in FIG. 3c. The upper surface of this MR multi-layered structure 32 operates as a junction.

The MR multi-layered structure 32 may be for example a TMR multi-layered structure, a CPP-GMR multi-layered structure, a TMR or CPP-GMR multi-layered structure with a bias layer for defining a magnetization direction of a free layer, a CPP-GMR multi-layered structure with an anti-ferromagnetic coupling type magnetic films, a CPP-GMR multi-layered structure with a specular type spin-valve magnetic films, or a CPP-GMR multi-layered structure with a dual spin-valve type magnetic films.

Figure 3D:
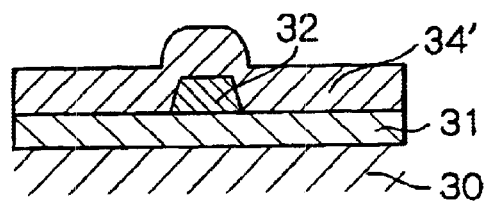

Then, after the photo-resist pattern 33 used as a mask is removed, an insulation film 34' of $Al_2O_3$ or $SiO_2$ for example with a thickness of about 50–100 nm is deposited on the entire surface as shown in FIG. 3d. Thus, the insulation film 34' is protruded at the junction. In order to ensure reliable electrical insulation, it is desired that the thickness of this insulation film 34' is determined to a value equal to or thicker than that of the MR multi-layered structure 32.

Figure 3E:
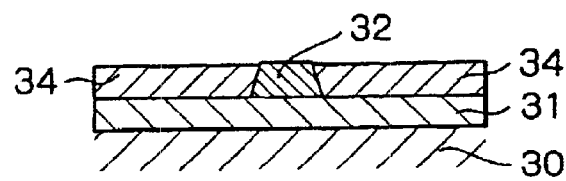

Thereafter, as shown in FIG. 3e, the insulation film 34' is flattened until at least the upper surface or junction of the MR multi-layered structure 32 is exposed or appeared by executing a low angle IBE using a beam having a low incident angle with surfaces of laminated layers, and thus a flattened insulation film 34 is obtained.

In this case, it is preferred that an angle of the incident ion beam of the low angle IBE with the surfaces of laminated layers is 0–40 degrees. If this angle of the incident ion beam is more than 40 degrees, the flattening of the insulation film becomes difficult. The angle of the incident ion beam of the low angle IBE with the surfaces of laminated layers is more preferably 0–30 degrees, and most preferably 0–20 degrees.

Termination of the flattening may be managed by monitoring a flattening process time or by executing an endpoint-detection process using a SIMS. In the latter case, because of a very small top surface area of the MR multi-layered structure 32, it is desired to laminate a film specifically used for endpoint detection using the SIMS in order to easily perform the endpoint-detection process. Concretely, the insulation film 34' is deposited to a height equal to or somewhat lower than that of the MR multi-layered structure 32, then an extremely thin film specially used for endpoint detection such as Co, Mn, Ti, Ta, Cr or else is deposited, and thereafter the insulation film 34' is again deposited thereon to make the endpoint detection process easier.

Etching conditions of an example of the low angle IBE are as follows:

Beam incident angle: 20 degrees;
Acceleration voltage: 300 V;
Beam current: 0.35 $mA/cm^2$;
Ar gas pressure: $2.4 \times 10^{-4}$ Torr;
Substrate temperature: 30° C.;
Etching time: about 15 minutes.

Figure 3F:
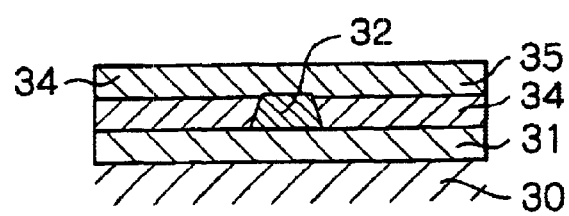

After that, an upper electrode film 35 which also functions as a magnetic shield film is deposited on the flattened insulation film 34 and the MR multi-layered structure 32 as shown in FIG. 3f.

A hard mask may be used instead of the photo-resist pattern 33. When a conductive hard mask is used, this hard mask may be remained without removing and used as a part of a cap layer of the MR multi-layered structure 32.

Figure 4A:
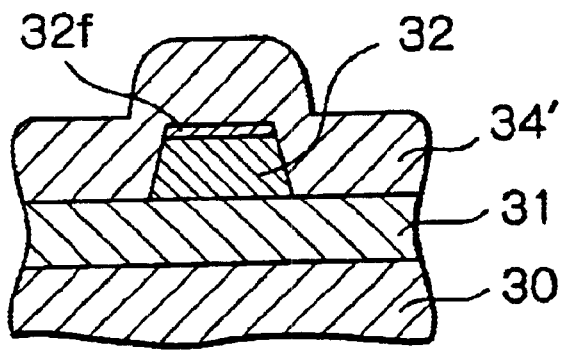
FIGS. 4a to 4c show sectional views illustrating in detail an actual flattening process in the embodiment of FIGS. 3a to 3f.
Figure 4B:
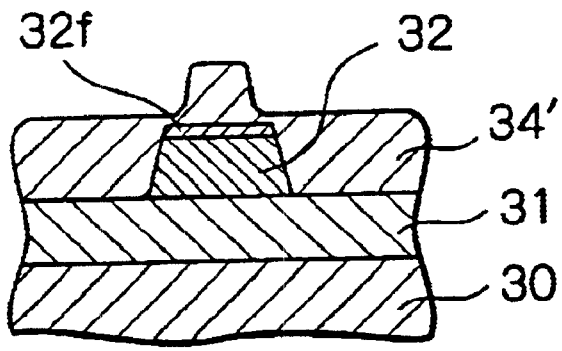
Figure 4C:
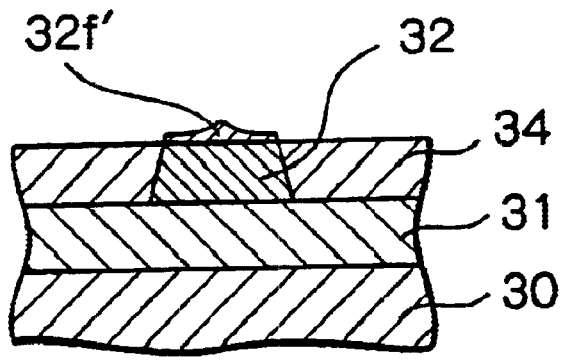

FIGS. 4a to 4c illustrate in detail an actual flattening process in the embodiment of FIGS. 3a to 3f.

As shown in these figures, in this embodiment, due to the flattening process of the insulation film 34, an upper portion of a cap layer 32f of the MR multi-layered structure 32 is in fact etched and thus a triangular protrusion 32f' of the cap layer with a height that is equal to several percents of a width of the upper surface of the MR multi-layered structure 32 (junction width) is formed at this portion. Thus, it is desired to deposit a layer with a thickness larger than the height of the protrusion 32f' as the cap layer 32f.

Figure 5:
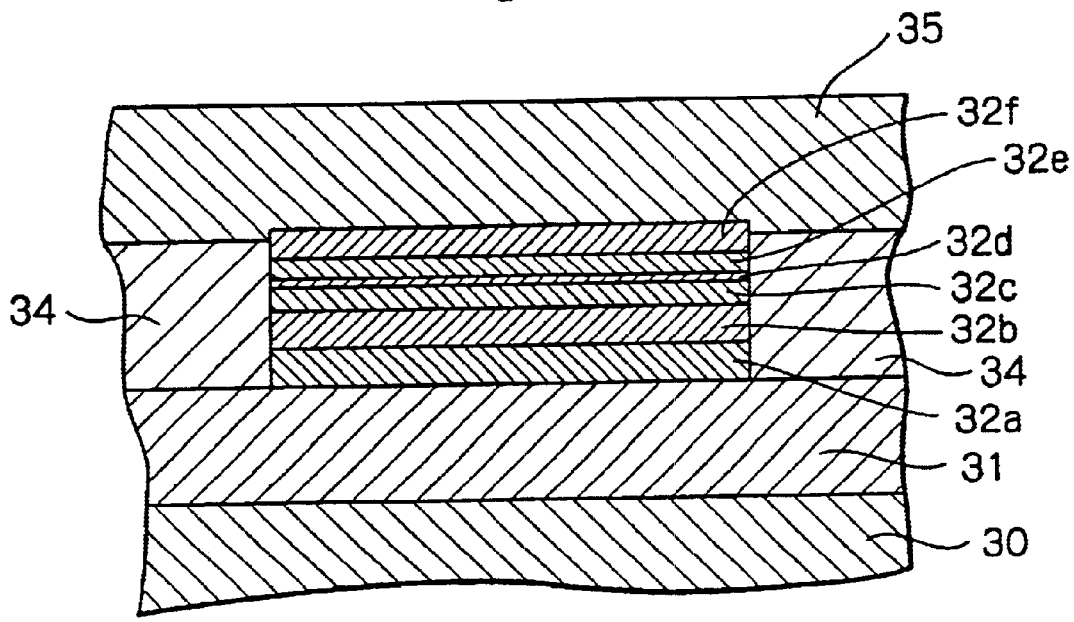
FIG. 5 shows a sectional view schematically illustrating an example of a multi-layered structure of the TMR head fabricated by the embodiment of FIGS. 3a to 3f.

FIG. 5 schematically illustrates an example of a multi-layered structure of the TMR head fabricated by the embodiment of FIGS. 3a to 3f.

As shown in the figure, the lower electrode film 31 with a thickness of about 2000 nm, which also functions as a magnetic shield film, is laminated on the insulation film 30, the MR multi-layered structure 32 is laminated thereon, and the upper electrode film 35 with a thickness of about 2000 nm, which also functions as a magnetic shield film is laminated thereon. The MR multi-layered structure 32 is composed of an under layer 32a with a thickness of about 0–20 nm, a pinning layer 32b with a thickness of about 10–20 nm, a pinned layer 32c with a thickness of about 5–6 nm, a tunnel barrier layer 32d with a thickness of about 1 nm, a free layer 32e with a thickness of about 4–6 nm, and a cap layer 32f with a thickness of about 5–10 nm sequentially laminated in this order. The under layer 32a with a thickness of 0 nm corresponds to a case where there is no under layer. The insulation film 34 is also formed on the lower electrode film 31 around the MR multi-layered structure 32.

The structure of a CPP-GMR head is the same as that of the TMR head except that a nonmagnetic metal layer with a thickness of about 2–5 nm is formed instead of the tunnel barrier layer 32d.

It is desired that the cap layer 32f is made of one of tantalum (Ta), rhodium (Rh), ruthenium (Ru), osmium (Os), tungsten (W), palladium (Pd), platinum (Pt) and gold (Au), or an alloy containing one of Ta, Rh, Ru, Os, W, Pd, Pt and Au.

Figure 6:
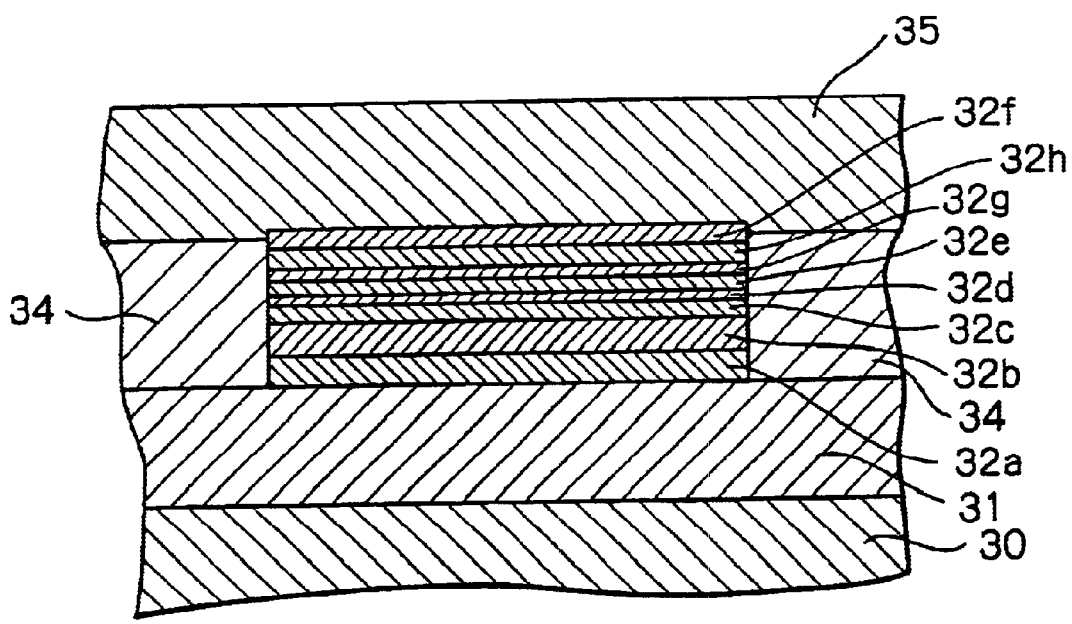
FIG. 6 shows a sectional view schematically illustrating another example of a multi-layered structure of the TMR head fabricated by the embodiment of FIGS. 3a to 3f.

FIG. 6 schematically illustrates another example of a multi-layered structure of the TMR head fabricated by the embodiment of FIGS. 3a to 3f.

In this example, the TMR multi-layered structure has a bias layer for defining a magnetization direction of a free layer. As shown in the figure, the lower electrode film 31 with a thickness of about 2000 nm, which also functions as a magnetic shield film, is laminated on the insulation film 30, the MR multi-layered structure 32 is laminated thereon, and the upper electrode film 35 with a thickness of about 2000 nm, which also functions as a magnetic shield film is laminated thereon. The MR multi-layered structure 32 is composed of an under layer 32a with a thickness of about 0–20 nm, a pinning layer 32b with a thickness of about 10–20 nm, a pinned layer 32c with a thickness of about 5–6 nm, a tunnel barrier layer 32d with a thickness of about 1 nm, a free layer 32e with a thickness of about 4–6 nm, a nonmagnetic metal layer 32g with a thickness of about 0.1–3 nm, an anti-ferromagnetic layer 32h with a thickness of about 10 nm, and a cap layer 32f with a thickness of about 5–10 nm sequentially laminated in this order. The under layer 32a with a thickness of 0 nm corresponds to a case where there is no under layer. The insulation film 34 is also formed on the lower electrode film 31 around the MR multi-layered structure 32.

The structure of a CPP-GMR head is the same as that of the TMR head except that a nonmagnetic metal layer with a thickness of about 2–5 nm is formed instead of the tunnel barrier layer 32d.

It is desired that the cap layer 32f is made of one of tantalum (Ta), rhodium (Rh), ruthenium (Ru), osmium (Os), tungsten (W), palladium (Pd), platinum (Pt) and gold (Au), or an alloy containing one of Ta, Rh, Ru, Os, W, Pd, Pt and Au.

As aforementioned, according to this embodiment, the insulation film 34' is deposited on the MR multi-layered structure 32 and the lower electrode film 31, and then this insulation film 34' is flattened until at least the upper surface of the MR multi-layered structure 32 is exposed or appeared by executing a low angle IBE to form a flattened insulation film 34 on and around the MR multi-layered structure 32.

Since a resist pattern or a hard mask with a straightly shaped side surface but no inversely tapered side surface can be used according to this method, more a finely micromachined MR multi-layered structure than that fabricated by using a lift-off method can be formed. Also, since an RIE method or a hard mask that will prevent widening of the bottom of the MR multi-layered structure can be utilized for milling the MR multi-layered structure 32, a very precise shape of the MR multi-layered structure 32 can be expected. Furthermore, because no burr nor overlap of the insulation film 34 will occur and thus a very strict track width can be defined, it is possible to easily fabricate a TMR element or GMR element with an extremely narrow track width of 200 nm or less. In fact, a TMR element with a track width of 100 nm and good output characteristics could be fabricated according to this embodiment.

FIGS. 7a to 7g illustrate a part of a fabrication process of a TMR head or a CPP-GMR head as another embodiment according to the present invention.

Figure 7A:
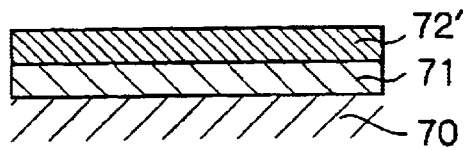
FIGS. 7a to 7g show sectional views illustrating a part of a fabrication process of a TMR head or a CPP-GMR head as another embodiment according to the present invention.

First, as shown in FIG. 7a, a lower electrode film 71 which also functions as a magnetic shield film and a MR multi-layered film 72' are sequentially deposited on an insulation film 70 formed on a substrate (not shown).

Figure 7D:
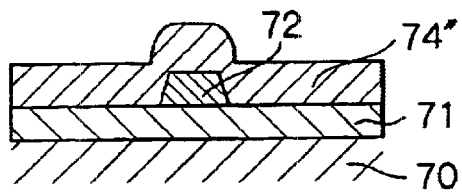
Figure 7B:
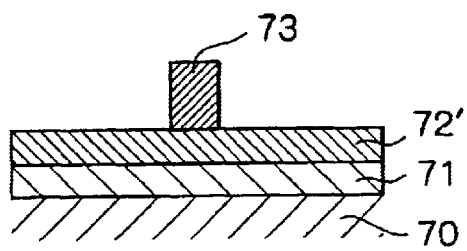

Then, a photo-resist pattern 73 with a straight shaped side wall is formed thereon as shown in FIG. 7b.

Figure 7E:
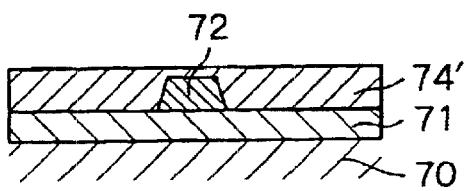
Figure 7C:
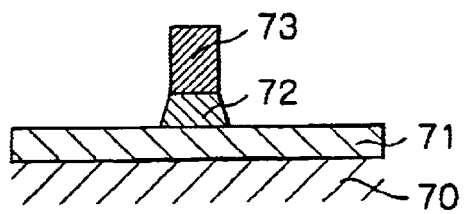

Then, the MR multi-layered film 72' is patterned by IBE, RIE, RIBE or sputtering using the photo-resist pattern 73 as a mask to obtain a MR multi-layered structure 72 as shown in FIG. 7c. The upper surface of this MR multi-layered structure 72 operates as a junction.

The MR multi-layered structure 72 may be for example a TMR multi-layered structure, a CPP-GMR multi-layered structure, a TMR or CPP-GMR multi-layered structure with a bias layer for defining a magnetization direction of a free layer, a CPP-GMR multi-layered structure with an anti-ferromagnetic coupling type magnetic films, a CPP-GMR multi-layered structure with a specular type spin-valve magnetic films, or a CPP-GMR multi-layered structure with a dual spin-valve type magnetic films.

Then, after the photo-resist pattern 73 used as a mask is removed, an insulation film 74" is deposited on the entire surface as shown in FIG. 7d. Thus, the insulation film 74" is protruded at the junction. In order to ensure reliable electrical insulation, it is desired that the thickness of this insulation film 74" is determined to a value equal to or thicker than that of the MR multi-layered structure 72.

Thereafter, as shown in FIG. 7e, the insulation film 74" is flattened by executing a low angle IBE using a beam having a low incident angle with surfaces of laminated layers, and thus a flattened insulation film 74' is obtained. This flattening is stopped before at least the upper surface or junction of the MR multi-layered structure 72 is exposed or appeared.

In this case, it is preferred that an angle of the incident ion beam of the low angle IBE with the surfaces of laminated layers is 0–40 degrees. If this angle of the incident ion beam is more than 40 degrees, the flattening of the insulation film becomes difficult. The angle of the incident ion beam of the low angle IBE with the surfaces of laminated layers is more preferably 0–30 degrees, and most preferably 0–20 degrees.

Termination of the flattening may be managed by monitoring a flattening process time.

Etching conditions of an example of the low angle IBE are as follows:

Beam incident angle: 20 degrees;

Acceleration voltage: 300 V;

Beam current: 0.35 mA/cm$^2$;

Ar gas pressure: 2.4×10$^{-4}$ Torr;

Substrate temperature: 30° C.;

Etching time: about 12 minutes.

Figure 7F:
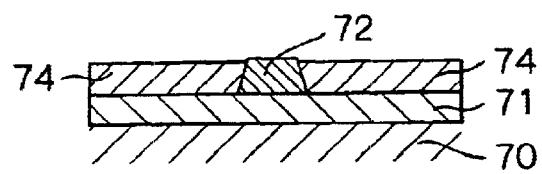

Then, as shown in FIG. 7f, the insulation film 74' is flattened until at least the upper surface or junction of the MR multi-layered structure 72 is exposed or appeared by executing a low rate IBE with a low etching rate such as an etching rate of 2 nm/min or less for etching of SiO$_2$, and thus a flattened insulation film 74 is obtained.

Termination of the latter flattening may be managed by monitoring a flattening process time or by executing an endpoint-detection process using a SIMS. In the latter case, because of a very small top surface area of the MR multi-layered structure 72, it is desired to laminate a film specifically used for endpoint detection using the SIMS in order to easily perform the endpoint-detection process. Concretely, the insulation film 74" is deposited to a height equal to or somewhat lower than that of the MR multi-layered structure 72, then an extremely thin film specially used for endpoint detection is deposited, and thereafter the insulation film 74" is again deposited thereon to make the endpoint detection process easier.

Etching conditions of an example of the low rate IBE are as follows:

Beam incident angle: 90 degrees;

Acceleration voltage: 250 V;

Beam current: 0.1 MA/cm$^2$;

Ar gas pressure: 2×10$^{-4}$ Torr;

Substrate temperature: 50° C.;

Etching time: about 10 minutes.

Figure 7G:
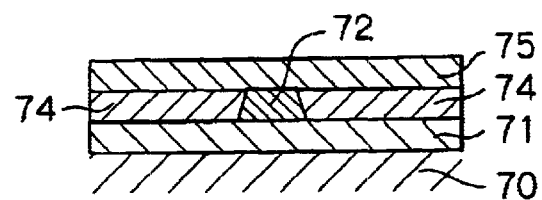

After that, an upper electrode film 75 which also functions as a magnetic shield film is deposited on the flattened insulation film 74 and the MR multi-layered structure 72 as shown in FIG. 7g.

A hard mask may be used instead of the photo-resist pattern 73. When a conductive hard mask is used, this hard mask may be remained without removing and used as a part of a cap layer of the MR multi-layered structure 72.

Thickness and material of each film or each layer in this embodiment are the same as those in the embodiment of FIGS. 3a–3f. Also, configuration of the MR multi-layered structure 72 is the same as that of the MR multi-layered structure 32 in the embodiment of FIGS. 3a–3f.

As aforementioned, according to this embodiment, the insulation film 74" is deposited on the MR multi-layered structure 72 and the lower electrode film 71, then this insulation film 74" is flattened to a certain extent, and thereafter the insulation film 74' is flattened by the low rate IBE using endpoint-detection of SIMS until at least the upper surface of the MR multi-layered structure 72 is exposed to form a flattened insulation film 74 on and around the MR multi-layered structure 72.

Since a resist pattern or a hard mask with a straightly shaped side surface but no inversely tapered side surface can be used according to this method, more a finely micromachined MR multi-layered structure than that fabricated by using a lift-off method can be formed. Also, since an RIE method or a hard mask that will prevent widening of the bottom of the MR multi-layered structure can be utilized for milling the MR multi-layered structure 72, a very precise shape of the MR multi-layered structure 72 can be expected. Furthermore, because no burr nor overlap of the insulation film 74 will occur and thus a very strict track width can be defined, it is possible to easily fabricate a TMR element or GMR element with an extremely narrow track width of 200 nm or less. In fact, a TMR element with a track width of 100 nm and good output characteristics could be fabricated according to this embodiment.

In addition, according to this embodiment, since the upper surface of the MR multi-layered structure 72 is exposed by the low rate IBE using endpoint-detection of SIMS, the termination of the flattening process can be very easily and precisely managed.

FIGS. 8a to 8g illustrate a part of a fabrication process of a TMR head or a CPP-GMR head as a further embodiment according to the present invention.

Figure 8A:
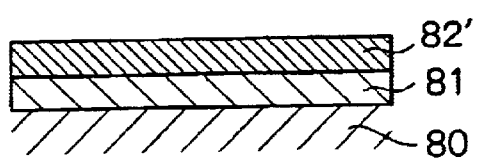
FIGS. 8a to 8g show sectional views illustrating a part of a fabrication process of a TMR head or a CPP-GMR head as a further embodiment according to the present invention.

First, as shown in FIG. 8a, a lower electrode film 81 which also functions as a magnetic shield film and a MR multi-layered film 82' are sequentially deposited on an insulation film 80 formed on a substrate (not shown).

Figure 8D:
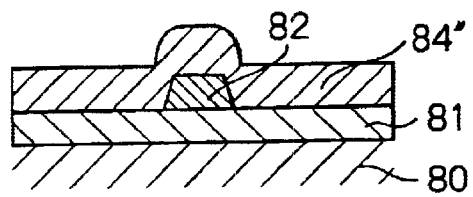
Figure 8B:
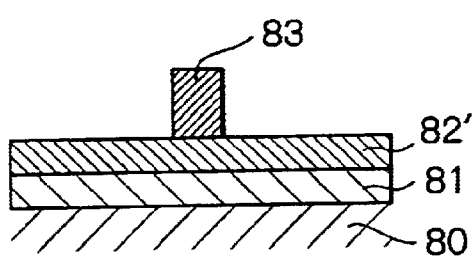

Then, a photo-resist pattern 83 with a straight shaped side wall is formed thereon as shown in FIG. 8b.

Figure 8E:
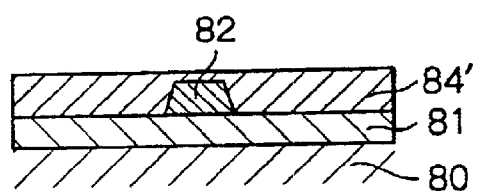
Figure 8C:
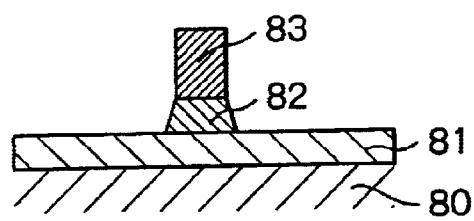

Then, the MR multi-layered film 82' is patterned by IBE, RIE, RIBE or sputtering using the photo-resist pattern 83 as a mask to obtain a MR multi-layered structure 82 as shown in FIG. 8c. The upper surface of this MR multi-layered structure 82 operates as a junction.

The MR multi-layered structure 82 may be for example a TMR multi-layered structure, a CPP-GMR multi-layered structure, a TMR or CPP-GMR multi-layered structure with a bias layer for defining a magnetization direction of a free layer, a CPP-GMR multi-layered structure with an antiferromagnetic coupling type magnetic films, a CPP-GMR multi-layered structure with a specular type spin-valve magnetic films, or a CPP-GMR multi-layered structure with a dual spin-valve type magnetic films.

Then, after the photo-resist pattern 83 used as a mask is removed, an insulation film 84" is deposited on the entire surface as shown in FIG. 8d. Thus, the insulation film 84" is protruded at the junction. In order to ensure reliable electrical insulation, it is desired that the thickness of this insulation film 84" is determined to a value equal to or thicker than that of the MR multi-layered structure 82.

Thereafter, as shown in FIG. 8e, the insulation film 84" is flattened by executing a GCIB, and thus a flattened insulation film 84' is obtained. This flattening is stopped before at least the upper surface or junction of the MR multi-layered structure 82 is exposed or appeared.

The flattening process using GCIB consists of producing gas clusters by ejecting a gas such as Ar gas into a high vacuum environment and rapidly cooling the gas, and bumping the produced gas clusters against a surface of an object so as to flatten the surface.

Termination of the flattening may be managed by monitoring a flattening process time.

Flattening conditions of an example of the GCIB are as follows:

Acceleration voltage: 15 kV;

Dose amount: $1 \times 10^{16}$ ions/cm$^2$.

Figure 8F:
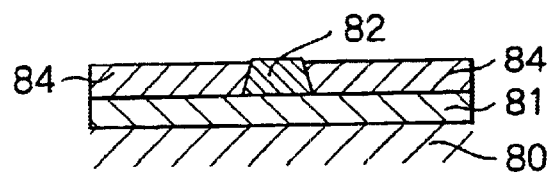

Then, as shown in FIG. 8f, the insulation film 84' is flattened until at least the upper surface or junction of the MR multi-layered structure 82 is exposed or appeared by executing a low rate IBE with a low etching rate such as an etching rate of 2 nm/min or less for etching of SiO$_2$, and thus a flattened insulation film 84 is obtained.

Termination of the latter flattening may be managed by monitoring a flattening process time or by executing an endpoint-detection process using a SIMS. In the latter case, because of a very small top surface area of the MR multi-layered structure 82, it is desired to laminate a film specifically used for endpoint detection using the SIMS in order to easily perform the endpoint-detection process. Concretely, the insulation film 84" is deposited to a height equal to or somewhat lower than that of the MR multi-layered structure 82, then an extremely thin film specially used for endpoint detection is deposited, and thereafter the insulation film 84" is again deposited thereon to make the endpoint detection process easier.

Etching conditions of an example of the low rate IBE are as follows:

Beam incident angle: 90 degrees;

Acceleration voltage: 250 V;

Beam current: 0.1 mA/cm$^2$;

Ar gas pressure: $2 \times 10^{-4}$ Torr;

Substrate temperature: 50° C.;

Etching time: about 15 minutes.

Figure 8G:
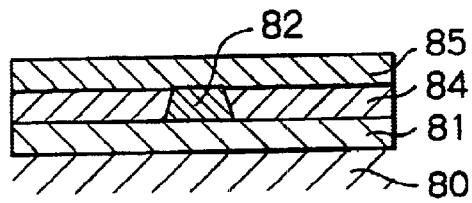

After that, an upper electrode film 85 which also functions as a magnetic shield film is deposited on the flattened insulation film 84 and the MR multi-layered structure 82 as shown in FIG. 8g.

A hard mask may be used instead of the photo-resist pattern 83. When a conductive hard mask is used, this hard mask may be remained without removing and used as a part of a cap layer of the MR multi-layered structure 82.

Thickness and material of each film or each layer in this embodiment are the same as those in the embodiment of FIGS. 3a–3f. Also, configuration of the MR multi-layered structure 82 is the same as that of the MR multi-layered structure 32 in the embodiment of FIGS. 3a–3f.

As aforementioned, according to this embodiment, the insulation film 84' is deposited on the MR multi-layered structure 82 and the lower electrode film 81, then this insulation film 84" is flattened using GCIB to a certain extent, and thereafter the insulation film 84' is flattened by the low rate IBE using endpoint-detection of SIMS until at least the upper surface of the MR multi-layered structure 82 is exposed to form a flattened insulation film 84 on and around the MR multi-layered structure 82.

Since a resist pattern or a hard mask with a straightly shaped side surface but no inversely tapered side surface can be used according to this method, more a finely micromachined MR multi-layered structure than that fabricated by using a lift-off method can be formed. Also, since an RIE method or a hard mask that will prevent widening of the bottom of the MR multi-layered structure can be utilized for milling the MR multi-layered structure 82, a very precise shape of the MR multi-layered structure 82 can be expected. Furthermore, because no burr nor overlap of the insulation film 84 will occur and thus a very strict track width can be defined, it is possible to easily fabricate a TMR element or GMR element with an extremely narrow track width of 200 nm or less. In fact, a TMR element with a track width of 100 nm and good output characteristics could be fabricated according to this embodiment.

In addition, according to this embodiment, since the upper surface of the MR multi-layered structure 82 is exposed by the low rate IBE using endpoint-detection of SIMS, the termination of the flattening process can be very easily and precisely managed. As an etching rate of GCIB is very low, it is difficult to flatten the insulation film until the upper surface of the MR multi-layered structure 82 is exposed by executing GCIB only.

FIGS. 9*a* to 9*h* illustrate a part of a fabrication process of a TMR head or a CPP-GMR head as a still further embodiment according to the present invention.

Figure 9A:
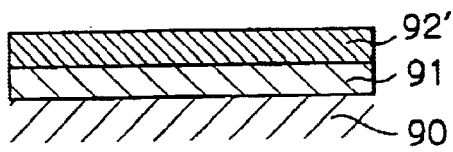
FIGS. 9a to 9h show sectional views illustrating a part of a fabrication process of a TMR head or a CPP-GMR head as a still further embodiment according to the present invention.

First, as shown in FIG. 9*a*, a lower electrode film 91 which also functions as a magnetic shield film and a MR multi-layered film 92' are sequentially deposited on an insulation film 90 formed on a substrate (not shown).

Figure 9E:
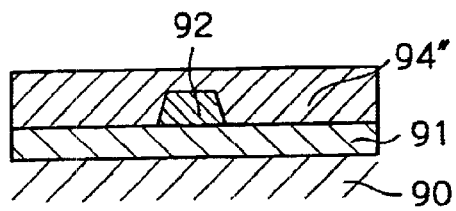
Figure 9B:
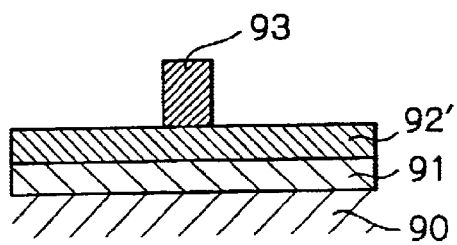

Then, a photo-resist pattern 93 with a straight shaped side wall is formed thereon as shown in FIG. 9*b*.

Figure 9F:
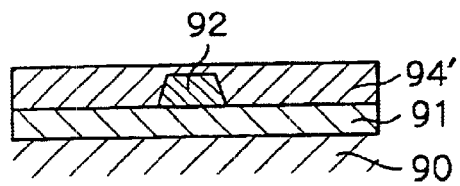
Figure 9C:
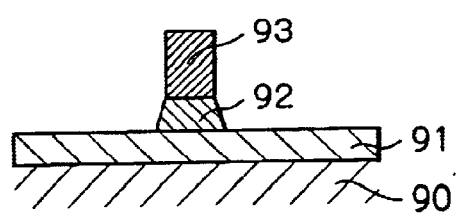

Then, the MR multi-layered film 92' is patterned by IBE, RIE, RIBE or sputtering using the photo-resist pattern 93 as a mask to obtain a MR multi-layered structure 92 as shown in FIG. 9*c*. The upper surface of this MR multi-layered structure 92 operates as a junction.

The MR multi-layered structure 92 may be for example a TMR multi-layered structure, a CPP-GMR multi-layered structure, a TMR or CPP-GMR multi-layered structure with a bias layer for defining a magnetization direction of a free layer, a CPP-GMR multi-layered structure with an antiferromagnetic coupling type magnetic films, a CPP-GMR multi-layered structure with a specular type spin-valve magnetic films, or a CPP-GMR multi-layered structure with a dual spin-valve type magnetic films.

Figure 9G:
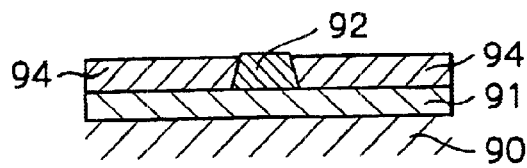
Figure 9D:
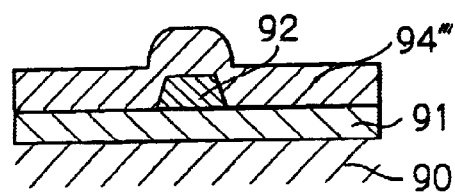

Then, after the photo-resist pattern 93 used as a mask is removed, an insulation film 94''' is deposited on the entire surface as shown in FIG. 9*d*. Thus, the insulation film 94''' is protruded at the junction. In order to ensure reliable electrical insulation, it is desired that the thickness of this insulation film 94''' is determined to a value equal to or thicker than that of the MR multi-layered structure 92.

Thereafter, as shown in FIG. 9*e*, the insulation film 94''' is flattened by executing a low angle IBE using a beam having a low incident angle with surfaces of laminated layers, and thus a flattened insulation film 94" is obtained.

In this case, it is preferred that an angle of the incident ion beam of the low angle IBE with the surfaces of laminated layers is 0–40 degrees. If this angle of the incident ion beam is more than 40 degrees, the flattening of the insulation film becomes difficult. The angle of the incident ion beam of the low angle IBE with the surfaces of laminated layers is more preferably 0–30 degrees, and most preferably 0–20 degrees.

Termination of the flattening may be managed by monitoring a flattening process time.

Etching conditions of an example of the low angle IBE are as follows:

Beam incident angle: 20 degrees;
Acceleration voltage: 300 V;
Beam current: 0.35 mA/cm$^2$;
Ar gas pressure: 2.4×10$^{-4}$ Torr;
Substrate temperature: 30° C.;
Etching time: about 12 minutes.

Thereafter, as shown in FIG. 9*f*, the insulation film 94" is flattened by executing a GCIB, and thus a flattened insulation film 94' is obtained. This flattening is stopped before at least the upper surface or junction of the MR multi-layered structure 92 is exposed or appeared.

The flattening process using GCIB consists of producing gas clusters by ejecting a gas such as Ar gas into a high vacuum environment and rapidly cooling the gas, and bumping the produced gas clusters against a surface of an object so as to flatten the surface.

Termination of the flattening may be managed by monitoring a flattening process time.

Flattening conditions of an example of the GCIB are as follows:

Acceleration voltage: 15 kV;
Dose amount: 1×11$^{16}$ ions/cm$^2$.

Then, as shown in FIG. 9*g*, the insulation film 94' is flattened until at least the upper surface or junction of the MR multi-layered structure 92 is exposed or appeared by executing a low rate IBE with a low etching rate such as an etching rate of 2 nm/min or less for etching of SiO$_2$, and thus a flattened insulation film 94 is obtained.

Termination of the latter flattening may be managed by monitoring a flattening process time or by executing an endpoint-detection process using a SIMS. In the latter case, because of a very small top surface area of the MR multi-layered structure 92, it is desired to laminate a film specifically used for endpoint detection using the SIMS in order to easily perform the endpoint-detection process. Concretely, the insulation film 94''' is deposited to a height equal to or somewhat lower than that of the MR multi-layered structure 92, then an extremely thin film specially used for endpoint detection is deposited, and thereafter the insulation film 94''' is again deposited thereon to make the endpoint detection process easier.

Etching conditions of an example of the low rate IBE are as follows:

Beam incident angle: 90 degrees;
Acceleration voltage: 250 V;
Beam current: 0.1 mA/cm$^2$;
Ar gas pressure: 2×10$^{-4}$ Torr;
Substrate temperature: 50° C.;
Etching time: about 15 minutes.

Figure 9H:
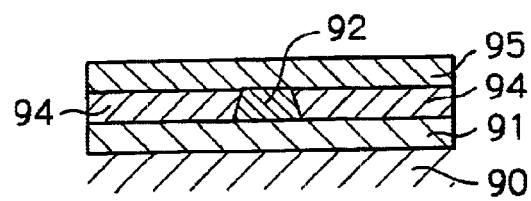

After that, an upper electrode film 95 which also functions as a magnetic shield film is deposited on the flattened insulation film 94 and the MR multi-layered structure 92 as shown in FIG. 9*h*.

A hard mask may be used instead of the photo-resist pattern 93. When a conductive hard mask is used, this hard mask may be remained without removing and used as a part of a cap layer of the MR multi-layered structure 92.

Thickness and material of each film or each layer in this embodiment are the same as those in the embodiment of FIGS. 3*a*–3*f*. Also, configuration of the MR multi-layered structure 92 is the same as that of the MR multi-layered structure 32 in the embodiment of FIGS. 3*a*–3*f*.

As aforementioned, according to this embodiment, the insulation film 94''' is deposited on the MR multi-layered structure 92 and the lower electrode film 81, then this insulation film 94''' is flattened using the low angle IBE and GCIB to a certain extent, and thereafter the insulation film 94' is flattened by the low rate IBE using endpoint-detection of SIMS until at least the upper surface of the MR multi-layered structure 92 is exposed to form a flattened insulation film 94 on and around the MR multi-layered structure 92.

Since a resist pattern or a hard mask with a straightly shaped side surface but no inversely tapered side surface can be used according to this method, more a finely micromachined MR multi-layered structure than that fabricated by using a lift-off method can be formed. Also, since an RIE method or a hard mask that will prevent widening of the bottom of the MR multi-layered structure can be utilized for milling the MR multi-layered structure 92, a very precise shape of the MR multi-layered structure 92 can be expected. Furthermore, because no burr nor overlap of the insulation film 94 will occur and thus a very strict track width can be defined, it is possible to easily fabricate a TMR element or GMR element with an extremely narrow track width of 200 nm or less. In fact, a TMR element with a track width of 100 nm and good output characteristics could be fabricated according to this embodiment.

In addition, according to this embodiment, since the upper surface of the MR multi-layered structure 92 is exposed by the low rate IBE using endpoint-detection of SIMS, the termination of the flattening process can be very easily and precisely managed. As an etching rate of GCIB is very low, it is difficult to flatten the insulation film until the upper surface of the MR multi-layered structure 92 is exposed by executing GCIB only.

FIGS. 10a to 10f illustrate a part of a fabrication process of a TMR head or a CPP-GMR head as a further embodiment according to the present invention.

Figure 10A:
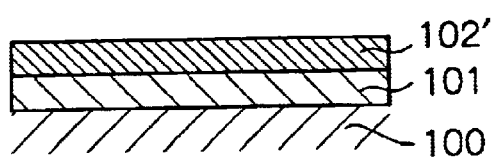
FIGS. 10a to 10f show sectional views illustrating a part of a fabrication process of a TMR head or a CPP-GMR head as a further embodiment according to the present invention.

First, as shown in FIG. 10a, a lower electrode film 101 which also functions as a magnetic shield film and a MR multi-layered film 102' are sequentially deposited on an insulation film 100 formed on a substrate (not shown).

Figure 10D:
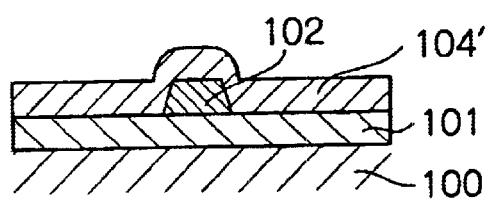
Figure 10B:
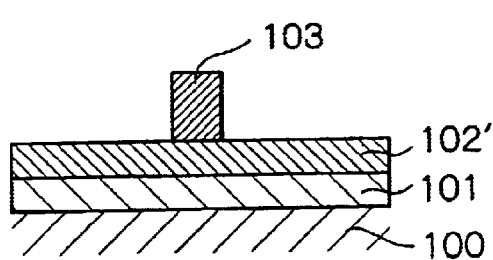

Then, a photo-resist pattern 103 with a straight shaped side wall is formed thereon as shown in FIG. 10b.

Figure 10E:
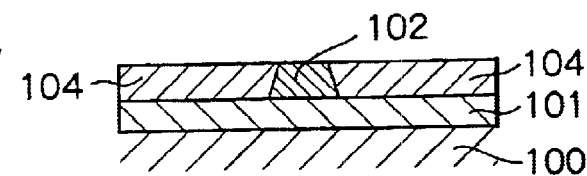
Figure 10C:
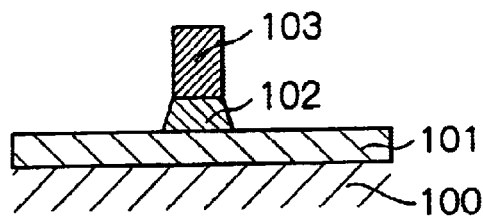

Then, the MR multi-layered film 102' is patterned by IBE, RIE, RIBE or sputtering using the photo-resist pattern 103 as a mask to obtain a MR multi-layered structure 102 as shown in FIG. 10c. The upper surface of this MR multi-layered structure 102 operates as a junction.

The MR multi-layered structure 102 may be for example a TMR multi-layered structure, a CPP-GMR multi-layered structure, a TMR or CPP-GMR multi-layered structure with a bias layer for defining a magnetization direction of a free layer, a CPP-GMR multi-layered structure with an antiferromagnetic coupling type magnetic films, a CPP-GMR multi-layered structure with a specular type spin-valve magnetic films, or a CPP-GMR multi-layered structure with a dual spin-valve type magnetic films.

Then, after the photo-resist pattern 103 used as a mask is removed, an insulation film 104' is deposited on the entire surface as shown in FIG. 10d. Thus, the insulation film 104' is protruded at the junction. In order to ensure reliable electrical insulation, it is desired that the thickness of this insulation film 104' is determined to a value equal to or thicker than that of the MR multi-layered structure 102.

Thereafter, as shown in FIG. 10e, the insulation film 104' is flattened until at least the upper surface or junction of the MR multi-layered structure 102 is exposed or appeared by executing a precise CMP, and thus a flattened insulation film 104 and the MR multi-layered structure 102 with the appeared upper surface are obtained.

The precise CMP is a process of more precisely controlled CMP than a normal CMP process. In the precise CMP process, a dry or wet CMP remaining a low height difference is executed and a low lapping rate of 50 nm/min or less, preferably of 20 nm/min or less, more preferably of 10 nm/min or less is used. If the lapping rate exceeds 50 nm/min, a precise CMP will become difficult to perform.

For this purpose, a slurry consisting of one of colloidal silica, cerium oxide, corundum, boron nitride, diamond, chromium oxide, iron oxide, fumed silica, alumina and zeolite, or of a mixture containing one of colloidal silica, cerium oxide, corundum, boron nitride, diamond, chromium oxide, iron oxide, fumed silica, alumina and zeolite may be additionally used. The slurry has an average particle diameter of 100 nm or less, preferably 50 nm or less, more preferably 10 nm or less. If the average particle diameter of the slurry exceeds 100 nm, a precise CMP will become difficult to perform. A rotational speed of a rotation table is 1 to 10,000 rpm. If the rotational speed is less than 1 rpm, because of too low lapping rate, a productivity will decrease. Contrary to this, if the rotational speed exceeds 10,000 rpm, a precise CMP will become difficult to perform.

Termination of the flattening may be managed by monitoring a flattening process time.

Figure 10F:
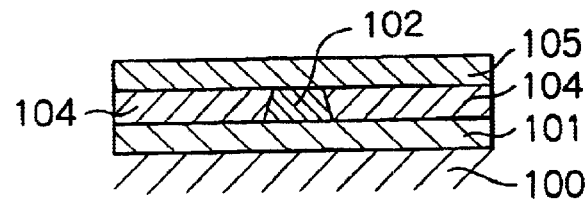

After that, an upper electrode film 105 which also functions as a magnetic shield film is deposited on the flattened insulation film 104 and the MR multi-layered structure 102 as shown in FIG. 10f.

A hard mask may be used instead of the photo-resist pattern 103. When a conductive hard mask is used, this hard mask may be remained without removing and used as a part of a cap layer of the MR multi-layered structure 102.

Thickness and material of each film or each layer in this embodiment are the same as those in the embodiment of FIGS. 3a–3f. Also, configuration of the MR multi-layered structure 102 is the same as that of the MR multi-layered structure 32 in the embodiment of FIGS. 3a–3f.

As aforementioned, according to this embodiment, the insulation film 104' is deposited on the MR multi-layered structure 102 and the lower electrode film 101, then this insulation film 104' is flattened by a precise CMP until at least the upper surface of the MR multi-layered structure 102 is exposed to form a flattened insulation film 104 on and around the MR multi-layered structure 102.

Since a resist pattern or a hard mask with a straightly shaped side surface but no inversely tapered side surface can be used according to this method, more a finely micromachined MR multi-layered structure than that fabricated by using a lift-off method can be formed. Also, since an RIE method or a hard mask that will prevent widening of the bottom of the MR multi-layered structure can be utilized for milling the MR multi-layered structure 102, a very precise shape of the MR multi-layered structure 102 can be expected. Furthermore, because no burr nor overlap of the insulation film 104 will occur and thus a very strict track width can be defined, it is possible to easily fabricate a TMR element or GMR element with an extremely narrow track width of 200 nm or less. In fact, a TMR element with a track width of 100 nm and good output characteristics could be fabricated according to this embodiment.

When the insulation film 104' is deposited, a recess may be produced around the MR multi-layered structure 102. Thus, a part of the deposited upper electrode film 105 will enter the recess and a magnetic field passing through this electrode film part will be applied to the MR multi-layered structure 102 causing its MR characteristics to deteriorate. However, according to this embodiment, since the recess is removed by CMP, it is possible to improve MR characteristics.

FIGS. 11a to 11h illustrate a part of a fabrication process of a TMR head or a CPP-GMR head as a still further embodiment according to the present invention.

Figure 11A:
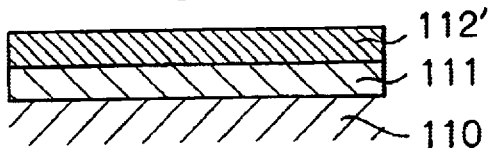
FIGS. 11a to 11h show sectional views illustrating a part of a fabrication process of a TMR head or a CPP-GMR head as a still further embodiment according to the present invention.

First, as shown in FIG. 11a, a lower electrode film 111 which also functions as a magnetic shield film and a MR multi-layered film 112' are sequentially deposited on an insulation film 110 formed on a substrate (not shown).

Figure 11B:
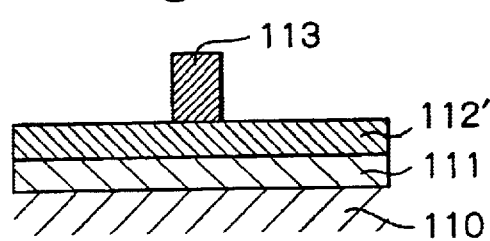

Then, a photo-resist pattern 113 with a straight shaped side wall is formed thereon as shown in FIG. 11b.

Figure 11C:
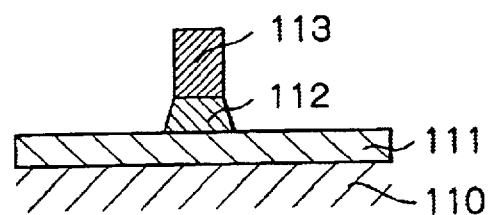

Then, the MR multi-layered film 112' is patterned by IBE, RIE, RIBE or sputtering using the photo-resist pattern 113 as a mask to obtain a MR multi-layered structure 112 as shown in FIG. 11c. The upper surface of this MR multi-layered structure 112 operates as a junction.

The MR multi-layered structure 112 may be for example a TMR multi-layered structure, a CPP-GMR multi-layered structure, a TMR or CPP-GMR multi-layered structure with a bias layer for defining a magnetization direction of a free layer, a CPP-GMR multi-layered structure with an anti-ferromagnetic coupling type magnetic films, a CPP-GMR multi-layered structure with a specular type spin-valve magnetic films, or a CPP-GMR multi-layered structure with a dual spin-valve type magnetic films.

Figure 11D:
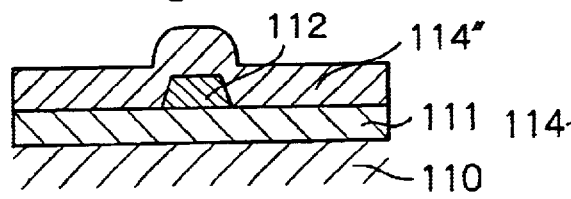

Then, after the photo-resist pattern 113 used as a mask is removed, an insulation film 114" is deposited on the entire surface as shown in FIG. 11d. Thus, the insulation film 114" is protruded at the junction. In order to ensure reliable electrical insulation, it is desired that the thickness of this insulation film 114" is determined to a value equal to or thicker than that of the MR multi-layered structure 112.

Figure 11E:
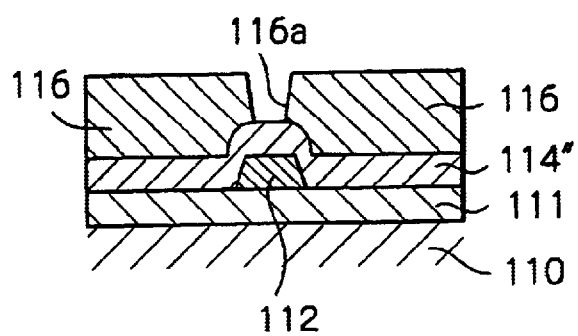

Then, as shown in FIG. 11e, a photo-resist pattern 116 with an opening 116a located at a contact hole is formed on the insulation film 114".

Figure 11F:
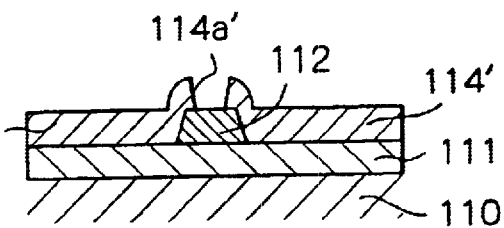

Then, as shown in FIG. 11f, the insulation film 114" is patterned using the photo-resist pattern 116 as a mask by ion milling to obtain an insulation film 114' provided with a contact hole 114a' on the MR multi-layered structure 112, and thereafter the photo-resist pattern 116 is removed.

Figure 11G:
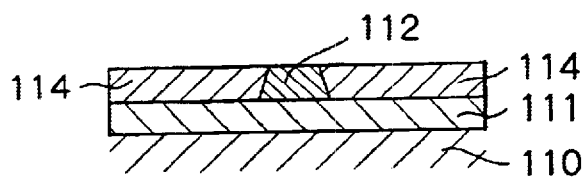

Thereafter, as shown in FIG. 11g, the insulation film 114' is flattened until at least the upper surface or junction of the MR multi-layered structure 112 is exposed or appeared by executing a precise CMP, and thus a flattened insulation film 114 and the MR multi-layered structure 112 with the appeared upper surface are obtained.

The precise CMP is a process of more precisely controlled CMP than a normal CMP process. In the precise CMP process, a dry or wet CMP remaining a low height difference is executed and a low lapping rate of 50 nm/min or less, preferably of 20 nm/min or less, more preferably of 10 nm/min or less is used. If the lapping rate exceeds 50 nm/min, a precise CMP will become difficult to perform.

For this purpose, a slurry consisting of one of colloidal silica, cerium oxide, corundum, boron nitride, diamond, chromium oxide, iron oxide, fumed silica, alumina and zeolite, or of a mixture containing one of colloidal silica, cerium oxide, corundum, boron nitride, diamond, chromium oxide, iron oxide, fumed silica, alumina and zeolite may be additionally used. The slurry has an average particle diameter of 100 nm or less, preferably 50 nm or less, more preferably 10 nm or less. If the average particle diameter of the slurry exceeds 100 nm, a precise CMP will become difficult to perform. A rotational speed of a rotation table is 1 to 10,000 rpm. If the rotational speed is less than 1 rpm, because of too low lapping rate, a productivity will decrease. Contrary to this, if the rotational speed exceeds 10,000 rpm, a precise CMP will become difficult to perform.

Termination of the flattening may be managed by monitoring a flattening process time.

Figure 11H:
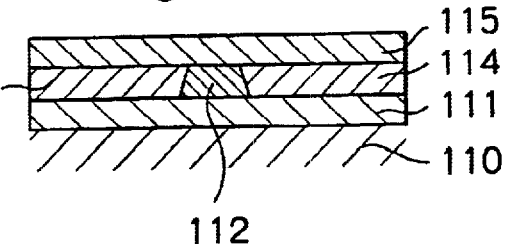

After that, an upper electrode film 115 which also functions as a magnetic shield film is deposited on the flattened insulation film 114 and the MR multi-layered structure 112 as shown in FIG. 11h.

A hard mask may be used instead of the photo-resist pattern 113. When a conductive hard mask is used, this hard mask may be remained without removing and used as a part of a cap layer of the MR multi-layered structure 112.

Thickness and material of each film or each layer in this embodiment are the same as those in the embodiment of FIGS. 3a–3f. Also, configuration of the MR multi-layered structure 112 is the same as that of the MR multi-layered structure 32 in the embodiment of FIGS. 3a–3f.

As aforementioned, according to this embodiment, the insulation film 114" is deposited on the MR multi-layered structure 112 and the lower electrode film 111, then a contact hole is formed on this insulation film 114", and thereafter the insulation film 114' is flattened by a precise CMP until at least the upper surface of the MR multi-layered structure 112 is exposed to form a flattened insulation film 114 on and around the MR multi-layered structure 112.

Since a resist pattern or a hard mask with a straightly shaped side surface but no inversely tapered side surface can be used according to this method, more a finely micromachined MR multi-layered structure than that fabricated by using a lift-off method can be formed. Also, since an RIE method or a hard mask that will prevent widening of the bottom of the MR multi-layered structure can be utilized for milling the MR multi-layered structure 112, a very precise shape of the MR multi-layered structure 112 can be expected. Furthermore, because no burr nor overlap of the insulation film 114 will occur and thus a very strict track width can be defined, it is possible to easily fabricate a TMR element or GMR element with an extremely narrow track width of 200 nm or less. In fact, a TMR element with a track width of 100 nm and good output characteristics could be fabricated according to this embodiment.

When the insulation film 114" is deposited, a recess may be produced around the MR multi-layered structure 112. Thus, a part of the deposited upper electrode film 115 will enter the recess and a magnetic field passing through this electrode film part will be applied to the MR multi-layered structure 112 causing its MR characteristics to deteriorate. However, according to this embodiment, since the recess is removed by CMP, it is possible to improve MR characteristics.

In general, if protruded portions of the insulation film to be lapped by CMP have different sizes with each other, lapping conditions of CMP will become very severe and thus a dishing phenomenon where a part of the insulation film located in recess portions is never flattened but grown concave or a thinning phenomenon where the insulation film itself is unnecessarily thinned may occur. In order to prevent such phenomena from occurrence, it is preferred that center portions of the protrude portions are removed in different sizes by photo-milling to form contact holes with different diameters. As a result, substantial sizes of the protruded portions after milling become nearly equal and therefore a margin in lapping conditions of CMP increases.

A part of the fabrication process according to this embodiment is the same as a part of the contact-hole method. However, the fabrication process of this embodiment quite differs from that of the contact-hole method in that, after making contact holes, a part of the insulation film overlapped on the upper surface of the MR multi-layered structure 112 is completely removed by the CMP lapping process.

FIGS. 12a to 12g illustrate a part of a fabrication process of a TMR head or a CPP-GMR head as a still more further embodiment according to the present invention.

Figure 12A:
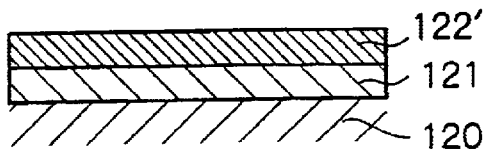
FIGS. 12a to 12g show sectional views illustrating a part of a fabrication process of a TMR head or a CPP-GMR head as a still more further embodiment according to the present invention.

First, as shown in FIG. 12a, a lower electrode film 121 which also functions as a magnetic shield film and a MR multi-layered film 122' are sequentially deposited on an insulation film 120 formed on a substrate (not shown).

Figure 12B:
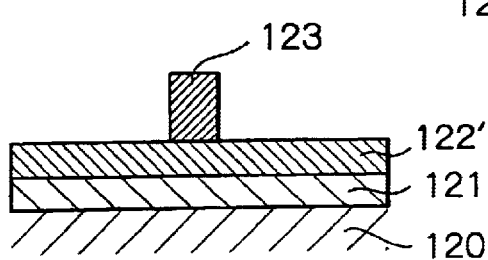

Then, a photo-resist pattern 123 with a straight shaped side wall is formed thereon as shown in FIG. 12b.

Figure 12C:
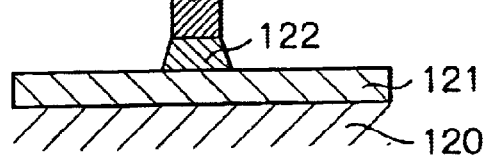

Then, the MR multi-layered film 122' with a thickness of about 35–55 nm is patterned by IBE, RIE, RIBE or sputtering using the photo-resist pattern 123 as a mask to obtain a MR multi-layered structure 122 as shown in FIG. 12c. The upper surface of this MR multi-layered structure 122 operates as a junction.

The MR multi-layered structure 122 may be for example a TMR multi-layered structure, a CPP-GMR multi-layered structure, a TMR or CPP-GMR multi-layered structure with a bias layer for defining a magnetization direction of a free layer, a CPP-GMR multi-layered structure with an antiferromagnetic coupling type magnetic films, a CPP-GMR multi-layered structure with a specular type spin-valve magnetic films, or a CPP-GMR multi-layered structure with a dual spin-valve type magnetic films.

Figure 12D:
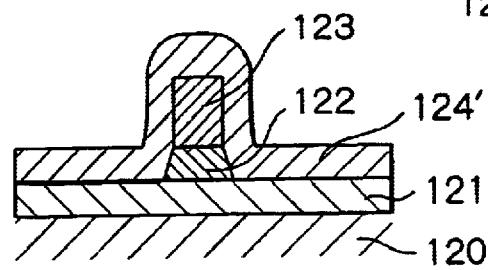

Then, while the photo-resist pattern 123 used as a mask is remained without removing, an insulation film 124' made of $Al_2O_3$ or $SiO_2$ for example with a thickness of about 50–100 nm is deposited on the entire surface as shown in FIG. 12d. Thus, the insulation film 124' is protruded at the junction. In order to ensure reliable electrical insulation, it is desired that the thickness of this insulation film 124' is determined to a value equal to or thicker than that of the MR multi-layered structure 122.

Figure 12E:
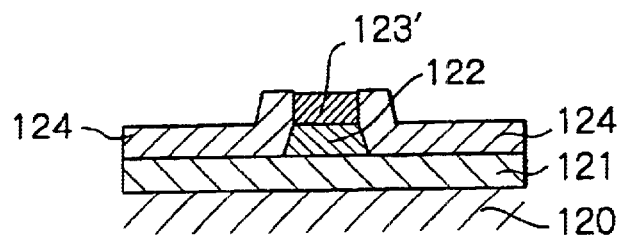

Thereafter, as shown in FIG. 12e, the insulation film 124' is lapped until a part of the photo-resist pattern 123 on the upper surface or junction of the MR multi-layered structure 122 remains by executing a precise CMP, and thus an insulation film 124 is obtained.

The precise CMP is a process of more precisely controlled CMP than a normal CMP process. In the precise CMP process, a dry or wet CMP remaining a low height difference is executed and a low lapping rate of 50 nm/min or less, preferably of 20 nm/min or less, more preferably of 10 nm/min or less is used. If the lapping rate exceeds 50 nm/min, a precise CMP will become difficult to perform.

For this purpose, a slurry consisting of one of colloidal silica, cerium oxide, corundum, boron nitride, diamond, chromium oxide, iron oxide, fumed silica, alumina and zeolite, or of a mixture containing one of colloidal silica, cerium oxide, corundum, boron nitride, diamond, chromium oxide, iron oxide, fumed silica, alumina and zeolite may be additionally used. The slurry has an average particle diameter of 100 nm or less, preferably 50 nm or less, more preferably 10 nm or less. If the average particle diameter of the slurry exceeds 100 nm, a precise CMP will become difficult to perform. A rotational speed of a rotation table is 1 to 10,000 rpm. If the rotational speed is less than 1 rpm, because of too low lapping rate, a productivity will decrease. Contrary to this, if the rotational speed exceeds 10,000 rpm, a precise CMP will become difficult to perform.

Termination of the lapping may be managed by monitoring a lapping process time.

Figure 12F:
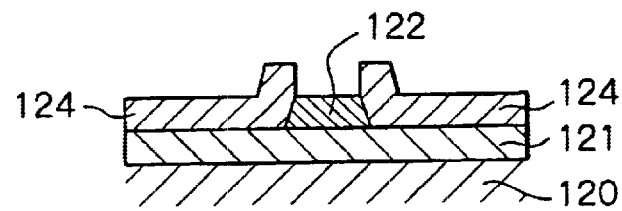

Then, as shown in FIG. 12f, the remained part of the photo-resist pattern 123' is removed by a solvent.

Figure 12G:
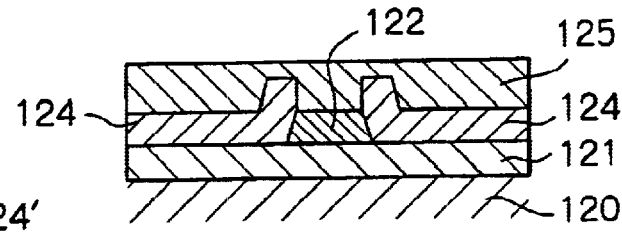

After that, an upper electrode film 125 which also functions as a magnetic shield film is deposited on the insulation film 124 and the MR multi-layered structure 122 as shown in FIG. 12g.

A hard mask may be used instead of the photo-resist pattern 123. When a conductive hard mask is used, this hard mask may be remained without removing and used as a part of a cap layer of the MR multi-layered structure 122.

Configuration of the MR multi-layered structure 122 is the same as that of the MR multi-layered structure 32 in the embodiment of FIGS. 3a–3f. Namely, the layer structure of this TMR head is the same as that shown in FIG. 5.

The cap layer 122f is preferably made of one of tantalum, rhodium, ruthenium, osmium, tungsten, palladium, platinum and gold, or an alloy containing one of tantalum, rhodium, ruthenium, osmium, tungsten, palladium, platinum and gold.

As aforementioned, according to this embodiment, the insulation film 124' is deposited on the MR multi-layered structure 122 and the lower electrode film 121 without removing the photo-resist pattern 123 used as a mask but remaining whole of it, then the deposited insulation film 124' is lapped by a precise CMP until a part of the photo-resist pattern 123 located on the upper surface of the MR multi-layered structure 102 remains, and the insulation film 124 on and around the MR multi-layered structure 122 is obtained by removing the remained part of the photo-resist pattern 123.

Since a resist pattern or a hard mask with a straightly shaped side surface but no inversely tapered side surface can be used according to this method, more a finely micromachined MR multi-layered structure than that fabricated by using a lift-off method can be formed. Also, since an RIE method or a hard mask that will prevent widening of the bottom of the MR multi-layered structure can be utilized for milling the MR multi-layered structure 102, a very precise shape of the MR multi-layered structure 102 can be expected. Furthermore, because no burr nor overlap of the insulation film 124 will occur and thus a very strict track width can be defined, it is possible to easily fabricate a TMR element or GMR element with an extremely narrow track width of 200 nm or less. In concrete, a TMR element with a track width of 100 nm and good output characteristics can be fabricated according to this embodiment.

When the insulation film 124' is deposited, a recess may be produced around the MR multi-layered structure 122. Thus, a part of the deposited upper electrode film 125 will enter the recess and a magnetic field passing through this electrode film part will be applied to the MR multi-layered structure 122 causing its MR characteristics to deteriorate. However, according to this embodiment, since the recess is removed by CMP, it is possible to improve MR characteristics.

In most cases, termination of a CMP process is managed by monitoring a lapping process time. As for a precise CMP process, it is necessary to perform this termination management in an extremely precise manner. In this embodiment, in order to more easily execute this termination management, the insulation film 124' is deposited without removing the photo-resist pattern 123 after the milling process, then the deposited insulation film 124' is lapped by the CMP until a part of the photo-resist pattern 123 remains, and thereafter the remained photo-resist is removed by a solvent. Therefore, according to this embodiment, the CMP process may be terminated at an arbitrary time before a part of the photo-resist pattern 123 remains. In other words, this embodiment will allow a rough termination management.

FIGS. 13a to 13h illustrate a part of a fabrication process of a TMR head or a CPP-GMR head as a further embodiment according to the present invention.

Figure 13A:
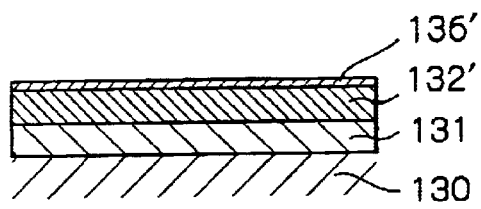
FIGS. 13a to 13h show sectional views illustrating a part of a fabrication process of a TMR head or a CPP-GMR head as a further embodiment according to the present invention.

First, as shown in FIG. 13a, a lower electrode film 131 which also functions as a magnetic shield film, a MR multi-layered film 132' and a CMP stop film 136' are sequentially deposited on an insulation film 130 formed on a substrate (not shown).

The CMP stop film 136' is made of a material that is harder to be lapped than materials to be lapped by CMP. By using such CMP stop film, because the lapping rate will extremely decrease and thus the lapping will substantially stop, or a necessary torque for lapping will suddenly increase, due to exposure of the CMP stop film during the CMP process, it is possible to know when the CMP process should be terminated. For example, in case that the insulation film 134' is $SiO_2$, $Al_2O_3$ that has a lower lapping rate than $SiO_2$ is used as the CMP stop film 136'. In case that $Al_2O_3$ is used as the insulation film 134', DLC that has a lower lapping rate than $Al_2O_3$ is used as the CMP stop film 136'.

Figure 13B:
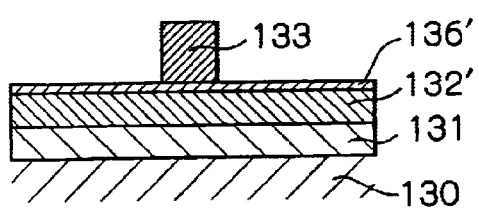

Then, a photo-resist pattern 133 with a straight shaped side wall is formed thereon as shown in FIG. 13b.

Figure 13C:
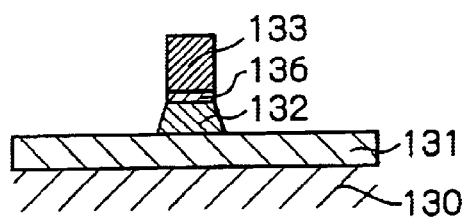

Then, the CMP stop film 136' and the MR multi-layered film 132' are patterned by IBE, RIE, RIBE or sputtering using the photo-resist pattern 133 as a mask to obtain a CMP stop film 136 and a MR multi-layered structure 132 as shown in FIG. 13c. The upper surface of this MR multi-layered structure 132 operates as a junction.

The MR multi-layered structure 132 may be for example a TMR multi-layered structure, a CPP-GMR multi-layered structure, a TMR or CPP-GMR multi-layered structure with a bias layer for defining a magnetization direction of a free layer, a CPP-GMR multi-layered structure with an antiferromagnetic coupling type magnetic films, a CPP-GMR multi-layered structure with a specular type spin-valve magnetic films, or a CPP-GMR multi-layered structure with a dual spin-valve type magnetic films.

Figure 13D:
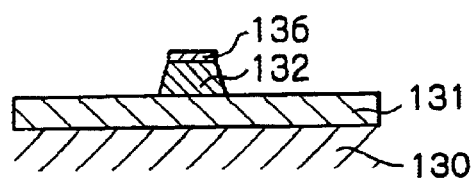

Then, the photo-resist pattern 133 used as a mask is removed as shown in FIG. 13d.

Figure 13E:
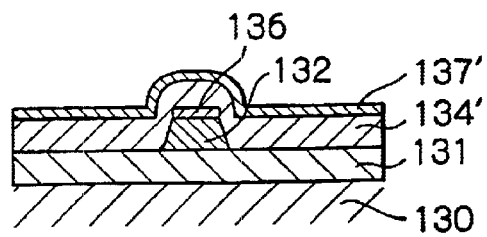

Then, an insulation film 134' is deposited on the entire surface. Thus, the insulation film 134' is protruded at the junction. Furthermore, as shown in FIG. 13e, a CMP stop film 137' is deposited on the entire surface of the insulation film 134'. This CMP stop film 137' is formed to augment functions of the CMP stop film 136', so that the upper surface thereof is substantially equal to the level of the upper surface of the CMP stop film 136'. A material of this CMP stop film 137' is the same as that of the CMP stop film 136'.

Figure 13F:
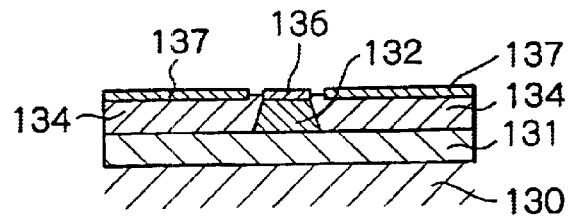

Thereafter, as shown in FIG. 13f, the insulation film 134' above the upper surface or junction of the MR multi-layered structure 132 is lapped and removed until the CMP stop film 134' is exposed or appeared by executing a precise CMP.

The precise CMP is a process of more precisely controlled CMP than a normal CMP process. In the precise CMP process, a dry or wet CMP remaining a low height difference is executed and a low lapping rate of 50 nm/min or less, preferably of 20 nm/min or less, more preferably of 10 nm/min or less is used. If the lapping rate exceeds 50 nm/min, a precise CMP will become difficult to perform.

For this purpose, a slurry consisting of one of colloidal silica, cerium oxide, corundum, boron nitride, diamond, chromium oxide, iron oxide, fumed silica, alumina and zeolite, or of a mixture containing one of colloidal silica, cerium oxide, corundum, boron nitride, diamond, chromium oxide, iron oxide, fumed silica, alumina and zeolite may be additionally used. The slurry has an average particle diameter of 100 nm or less, preferably 50 nm or less, more preferably 10 nm or less. If the average particle diameter of the slurry exceeds 100 nm, a precise CMP will become difficult to perform. A rotational speed of a rotation table is 1 to 10,000 rpm. If the rotational speed is less than 1 rpm, because of too low lapping rate, a productivity will decrease. Contrary to this, if the rotational speed exceeds 10,000 rpm, a precise CMP will become difficult to perform.

Termination of this lapping process may be managed by monitoring a flattening process time.

Figure 13G:
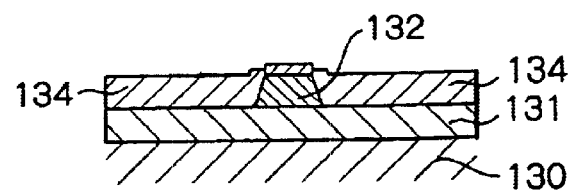

Then, as shown in FIG. 13g, the CMP stop films 136 and 137' are removed by IBE, RIE, RIBE or sputtering.

Figure 13H:
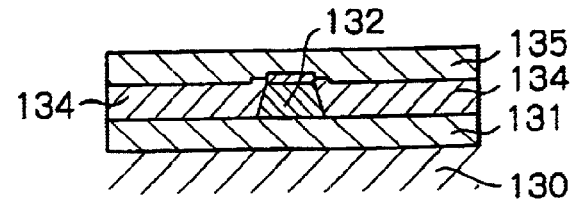

After that, an upper electrode film 135 which also functions as a magnetic shield film is deposited on the flattened insulation film 134 and the MR multi-layered structure 132 as shown in FIG. 13h.

A hard mask may be used instead of the photo-resist pattern 133. When a conductive hard mask is used, this hard mask may be remained without removing and used as a part of a cap layer of the MR multi-layered structure 132.

It is desired that a selective lapping ratio between the CMP stop films 136 and 137' and the insulation film 134' for CMP is four or more.

Thickness and material of each film or each layer in this embodiment are the same as those in the embodiments of FIGS. 3a–3f and FIGS. 12a–12g.

As aforementioned, according to this embodiment, the CMP stop films 136 and 137' are deposited on the MR multi-layered structure 132 and the insulation film 134', then the CMP stop film 137' and the insulation film 134' on the junction of the MR multi-layered structure 132 are lapped by a precise CMP until the CMP stop film 136 is exposed, and thereafter the CMP stop films 136 and 137 are removed to form an insulation film 134 on and around the MR multi-layered structure 132.

Since a resist pattern or a hard mask with a straightly shaped side surface but no inversely tapered side surface can be used according to this method, more a finely micromachined MR multi-layered structure than that fabricated by using a lift-off method can be formed. Also, since an RIE method or a hard mask that will prevent widening of the bottom of the MR multi-layered structure can be utilized for milling the MR multi-layered structure 132, a very precise shape of the MR multi-layered structure 132 can be expected. Furthermore, because no burr nor overlap of the insulation film 134 will occur and thus a very strict track width can be defined, it is possible to easily fabricate a TMR element or GMR element with an extremely narrow track width of 200 nm or less. Concretely, a TMR element with a track width of 100 nm and good output characteristics can be fabricated according to this embodiment.

When the insulation film 134' is deposited, a recess may be produced around the MR multi-layered structure 132. Thus, a part of the deposited upper electrode film 135 will enter the recess and a magnetic field passing through this electrode film part will be applied to the MR multi-layered structure 132 causing its MR characteristics to deteriorate. However, according to this embodiment, since the recess is removed by CMP, it is possible to improve MR characteristics.

Particularly, according to this embodiment, since the CMP stop films 136 and 137' are used for the CMP process, a uniformity in the lapping amount on a wafer can be assured.

FIGS. 14a to 14g illustrate a part of a fabrication process of a TMR head or a CPP-GMR head as a still further embodiment according to the present invention.

Figure 14A:
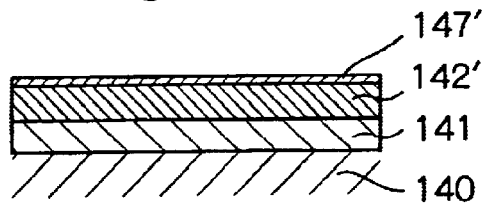
FIGS. 14a to 14g show sectional views illustrating a part of a fabrication process of a TMR head or a CPP-GMR head as a still further embodiment according to the present invention.

First, as shown in FIG. 14a, a lower electrode film 141 which also functions as a magnetic shield film, a MR multi-layered film 142' and a milling stop film 147' are sequentially deposited on an insulation film 140 formed on a substrate (not shown).

Figure 14B:
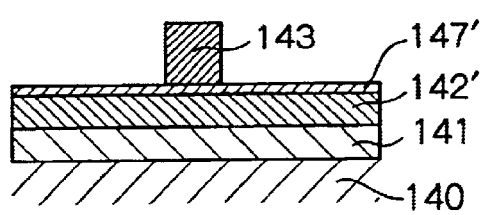

Then, a photo-resist pattern 143 with a straight shaped side wall is formed thereon as shown in FIG. 14b.

Figure 14C:
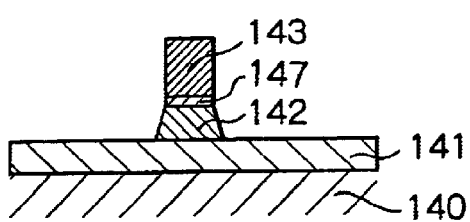

Then, the milling stop film 147' and the MR multi-layered film 142' are patterned by IBE, RIE, RIBE or sputtering using the photo-resist pattern 143 as a mask to obtain a milling stop film 147 and a MR multi-layered structure 142 as shown in FIG. 14c. The upper surface of this MR multi-layered structure 142 operates as a junction.

The milling stop film 147' is made of a material that is not contained in the films to be milled and has a high sensitivity so as to be easily detected. Thus, a transition element is preferable for the material. More concretely, the milling stop film 147' may be made of one of cobalt, tantalum, rhodium, ruthenium, osmium, tungsten, palladium, platinum and gold, or an alloy containing one of cobalt, tantalum, rhodium, ruthenium, osmium, tungsten, palladium, platinum and gold.

The MR multi-layered structure 142 may be for example a TMR multi-layered structure, a CPP-GMR multi-layered structure, a TMR or CPP-GMR multi-layered structure with a bias layer for defining a magnetization direction of a free layer, a CPP-GMR multi-layered structure with an anti-ferromagnetic coupling type magnetic films, a CPP-GMR multi-layered structure with a specular type spin-valve magnetic films, or a CPP-GMR multi-layered structure with a dual spin-valve type magnetic films.

Figure 14D:
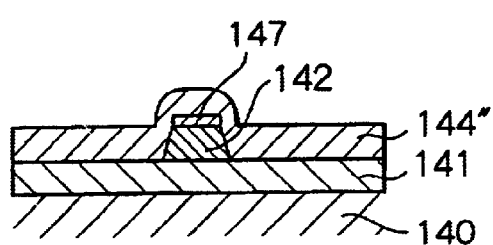

Then, as shown in FIG. 14d, an insulation film 144" is deposited on the entire surface. Thus, the insulation film 144" is protruded at the junction.

Figure 14E:
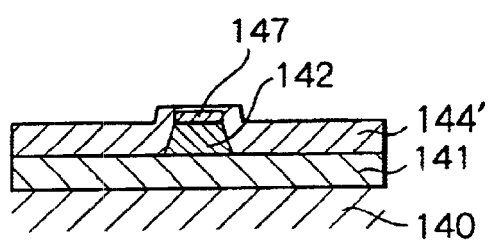

Thereafter, as shown in FIG. 14e, a part of the insulation film 144" above the upper surface or junction of the MR multi-layered structure 142 is lapped and removed by executing a precise CMP. This lapping and removing is stopped before the upper surface or junction of the MR multi-layered structure 142 is exposed or appeared.

The precise CMP is a process of more precisely controlled CMP than a normal CMP process. In the precise CMP process, a dry or wet CMP remaining a low height difference is executed and a low lapping rate of 50 nm/min or less, preferably of 20 nm/min or less, more preferably of 10 nm/min or less is used. If the lapping rate exceeds 50 nm/min, a precise CMP will become difficult to perform.

For this purpose, a slurry consisting of one of colloidal silica, cerium oxide, corundum, boron nitride, diamond, chromium oxide, iron oxide, fumed silica, alumina and zeolite, or of a mixture containing one of colloidal silica, cerium oxide, corundum, boron nitride, diamond, chromium oxide, iron oxide, fumed silica, alumina and zeolite may be additionally used. The slurry has an average particle diameter of 100 nm or less, preferably 50 nm or less, more preferably 10 nm or less. If the average particle diameter of the slurry exceeds 100 nm, a precise CMP will become difficult to perform. A rotational speed of a rotation table is 1 to 10,000 rpm. If the rotational speed is less than 1 rpm, because of too low lapping rate, a productivity will decrease. Contrary to this, if the rotational speed exceeds 10,000 rpm, a precise CMP will become difficult to perform.

Termination of this CMP process may be managed by monitoring a flattening process time.

Figure 14F:
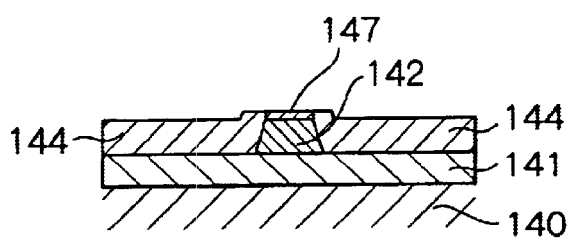

Then, as shown in FIG. 14f, the insulation film 144' on the milling stop film 147 is removed by IBE, RIE, RIBE or sputtering. The milling stop film 147 is not removed but remained. Termination of this milling process may be managed by using a SIMS.

Figure 14G:
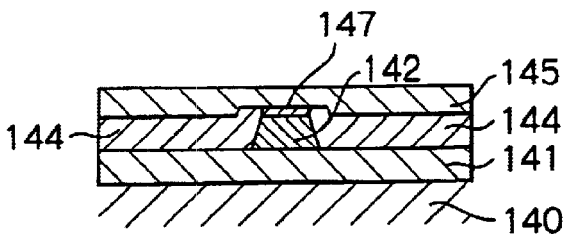

After that, an upper electrode film 145 which also functions as a magnetic shield film is deposited on the insulation film 144 and the milling stop film 147 as shown in FIG. 14g.

A hard mask may be used instead of the photo-resist pattern 143.

Thickness and material of each film or each layer in this embodiment are the same as those in the embodiments of FIGS. 3a–3f and FIGS. 12a–12g.

As aforementioned, according to this embodiment, the milling stop film 147 is deposited on the MR multi-layered structure 142, then the insulation film 144' on the junction of the MR multi-layered structure 142 is lapped by a precise CMP. This precise CMP is stopped before the upper surface or junction of the MR multi-layered structure 142 is exposed or appeared, and thereafter the remaining insulation film is removed by milling to form an insulation film 144 on and around the MR multi-layered structure 142.

Since a resist pattern or a hard mask with a straightly shaped side surface but no inversely tapered side surface can be used according to this method, more a finely micromachined MR multi-layered structure than that fabricated by using a lift-off method can be formed. Also, since an RIE method or a hard mask that will prevent widening of the bottom of the MR multi-layered structure can be utilized for milling the MR multi-layered structure 142, a very precise shape of the MR multi-layered structure 142 can be expected. Furthermore, because no burr nor overlap of the insulation film 144 will occur and thus a very strict track width can be defined, it is possible to easily fabricate a TMR element or GMR element with an extremely narrow track width of 200 nm or less. Concretely, a TMR element with a track width of 100 nm and good output characteristics can be fabricated according to this embodiment.

When the insulation film 144" is deposited, a recess may be produced around the MR multi-layered structure 142. Thus, a part of the deposited upper electrode film 145 will enter the recess and a magnetic field passing through this electrode film part will be applied to the MR multi-layered structure 132 causing its MR characteristics to deteriorate. However, according to this embodiment, since the recess is removed by CMP, it is possible to improve MR characteristics.

In most cases, termination of a CMP process is managed by monitoring a lapping process time. As for a precise CMP process, it is necessary to perform this termination management in an extremely precise manner. In this embodiment, in order to more easily execute this termination management, the milling stop film 147 is deposited on the junction, then the insulation film 144' is lapped by the CMP to its middle position, and thereafter the remained insulation film 144' is removed by milling until the milling stop film 147 is exposed or appeared. Therefore, according to this embodiment, the CMP process may be terminated at an arbitrary time before a part of the insulation film 144' remains. In other words, this embodiment will allow a rough termination management.

Many widely different embodiments of the present invention may be constructed without departing from the spirit and scope of the present invention. It should be understood that the present invention is not limited to the specific embodiments described in the specification, except as defined in the appended claims.

What is claimed is:

1. A manufacturing method of a thin-film magnetic head provided with a magnetoresistive effect element, said method comprising the steps of:

forming a magnetoresistive effect multi-layered structure in which a current flows in a direction perpendicular to surfaces of layers of said magnetoresistive effect multi-layered structure, on a lower electrode film;

depositing an insulation film on the formed magnetoresistive effect multi-layered structure and said lower electrode film to continuously cover said formed magnetoresistive effect multi-layered structure and said lower electrode film;

flattening the deposited continuously covering insulation film until at least an upper surface of said magnetoresistive effect multi-layered structure is exposed; and forming an upper electrode film on the flattened insulation film and said magnetoresistive effect multi-layered structure.

2. The manufacturing method as claimed in claim 1, wherein the forming step of said magnetoresistive effect multi-layered structure includes depositing a magnetoresistive effect multi-layered film on said lower electrode film, forming a mask on the deposited magnetoresistive effect multi-layered film, patterning the deposited magnetoresistive effect multi-layered film using the formed mask, and removing the mask to form said magnetoresistive effect multi-layered structure.

3. The manufacturing method as claimed in claim 1, wherein the forming step of said magnetoresistive effect multi-layered structure includes depositing a magnetoresistive effect multi-layered film on said lower electrode film, forming a mask on the deposited magnetoresistive effect multi-layered film, and patterning the deposited magnetoresistive effect multi-layered film using the formed mask to form said magnetoresistive effect multi-layered structure, said mask to be used as a cap layer of said magnetoresistive effect multi-layered structure.

4. The manufacturing method as claimed in claim 1, wherein the flattening step includes executing a low angle ion beam etching that uses a beam having a low incident angle with surfaces of laminated films.

5. The manufacturing method as claimed in claim 4, wherein said low incident angle is 0 to 40 degrees.

6. The manufacturing method as claimed in claim 1, wherein the flattening step includes executing a low angle ion beam etching that uses a beam having a low incident angle with surfaces of laminated films, and executing a low rate ion beam etching with a low etching rate.

7. The manufacturing method as claimed in claim 6, wherein said low incident angle is 0 to 40 degrees.

8. The manufacturing method as claimed in claim 1, wherein the flattening step includes executing a low angle ion beam etching that uses a beam having a low incident angle with surfaces of laminated films, executing a flattening process using gas clusters ion beam, and executing a low rate ion beam etching with a low etching rate.

9. The manufacturing method as claimed in claim 8, wherein said low incident angle is 0 to 40 degrees.

10. The manufacturing method as claimed in claim 1, wherein the flattening step includes executing a flattening process using gas clusters ion beam, and executing a low rate ion beam etching with a low etching rate.

11. The manufacturing method as claimed in claim 1, wherein the flattening step includes executing a chemical mechanical polishing.

12. The manufacturing method as claimed in claim 11, wherein said method further comprises a step of forming a contact hole on said insulation film on said magnetoresistive effect multi-layered structure before executing the flattening step.

13. The manufacturing method as claimed in claim 1, wherein termination of the flattening step is managed by monitoring a flattening step time.

14. The manufacturing method as claimed in claim 1, wherein termination of the flattening step is managed by executing endpoint detection.

15. The manufacturing method as claimed in claim 14, wherein said endpoint detection is executed by using a secondary ion mass spectroscopy.

16. The manufacturing method as claimed in claim 1, wherein said magnetoresistive effect multi-layered structure is a tunnel magnetoresistive effect multi-layered structure.

17. The manufacturing method as claimed in claim 1, wherein said magnetoresistive effect multi-layered structure is a current perpendicular to plane type giant magnetoresistive effect multi-layered structure.

18. The manufacturing method as claimed in claim 1, wherein said magnetoresistive effect multi-layered structure is a tunnel magnetoresistive effect multi-layered structure with a bias layer for defining a magnetization direction of a free layer in said tunnel magnetoresistive effect multi-layered structure.

19. The manufacturing method as claimed in claim 1, wherein said magnetoresistive effect multi-layered structure is a current perpendicular to plane type giant magnetoresistive effect multi-layered structure with a bias layer for defining a magnetization direction of a free layer in said current perpendicular to plane type giant magnetoresistive effect multi-layered structure.

20. A manufacturing method of a thin-film magnetic head provided with a magnetoresistive effect element, said method comprising the steps of:
    forming a magnetoresistive effect multi-layered structure in which a current flows in a direction perpendicular to surfaces of layers of said magnetoresistive effect multi-layered structure, on a lower electrode film;
    depositing an insulation film on a cover film formed on an upper surface of the formed magnetoresistive effect multi-layered structure and said lower electrode film;
    removing the deposited insulation film on said cover film formed on said magnetoresistive effect multi-layered structure until said cover film is exposed or before said cover film is exposed by executing chemical mechanical polishing; and
    forming an upper electrode film on said cover film or said magnetoresistive effect multi-layered structure and said insulation film.

21. The manufacturing method as claimed in claim 20, wherein the forming step of said magnetoresistive effect multi-layered structure includes depositing a magnetoresistive effect multi-layered film on said lower electrode film, forming a mask on the deposited magnetoresistive effect multi-layered film, and patterning the deposited magnetoresistive effect multi-layered film using the formed mask to form said magnetoresistive effect multi-layered structure.

22. The manufacturing method as claimed in claim 21, wherein said cover film is said formed mask.

23. The manufacturing method as claimed in claim 22, wherein the removing step includes removing the deposited insulation film on said mask formed on said magnetoresistive effect multi-layered structure until a part of said mask is removed by executing the chemical mechanical polishing, and removing remaining part of said mask after the chemical mechanical polishing.

24. The manufacturing method as claimed in claim 20, wherein the forming step of said magnetoresistive effect multi-layered structure includes depositing sequentially a magnetoresistive effect multi-layered film and a first chemical mechanical polishing stop film on said lower electrode film, forming a mask on the deposited first chemical mechanical polishing stop film, and patterning the deposited first chemical mechanical polishing stop film and the deposited magnetoresistive effect multi-layered film using the formed mask to form said magnetoresistive effect multi-layered structure.

25. The manufacturing method as claimed in claim 24, wherein said cover film is said first chemical mechanical polishing stop film.

26. The manufacturing method as claimed in claim 24, wherein said method further comprises a step of depositing a second chemical mechanical polishing stop film on the deposited insulation film.

27. The manufacturing method as claimed in claim 24, wherein the removing step includes removing the deposited insulation film on said first chemical mechanical polishing stop film formed on said magnetoresistive effect multi-layered structure until said first chemical mechanical polishing stop film is exposed by executing the chemical mechanical polishing.

28. The manufacturing method as claimed in claim 27, wherein said method further comprises a step of removing said first and second chemical mechanical polishing stop films after the chemical mechanical polishing.

29. The manufacturing method as claimed in claim 20, wherein the forming step of said magnetoresistive effect multi-layered structure includes depositing sequentially a magnetoresistive effect multi-layered film and a milling stop film on said lower electrode film, forming a mask on the deposited milling stop film, and patterning the deposited milling stop film and the deposited magnetoresistive effect multi-layered film using the formed mask to form said magnetoresistive effect multi-layered structure.

30. The manufacturing method as claimed in claim 29, wherein said cover film is said milling stop film.

31. The manufacturing method as claimed in claim 29, wherein the removing step includes removing the deposited insulation film on said milling stop film formed on said magnetoresistive effect multi-layered structure before said milling stop film is exposed by executing the chemical mechanical polishing.

32. The manufacturing method as claimed in claim 31, wherein said method further comprises a step of removing said insulation film on said milling stop film by milling after the chemical mechanical polishing, said milling stop film remaining.

33. The manufacturing method as claimed in claim 20, wherein the chemical mechanical polishing is a precise chemical mechanical polishing with a low lapping rate for maintaining a low height difference.

34. The manufacturing method as claimed in claim 33, wherein a lapping rate of said precise chemical mechanical polishing is 50 nm/mm or less.

35. The manufacturing method as claimed in claim 33, wherein said precise chemical mechanical polishing is executed using a slurry consisting of one of colloidal silica, cerium oxide, corundum, boron nitride, diamond, chromium oxide, iron oxide, fumed silica, alumina and zeolite, or of a mixture containing one of colloidal silica, cerium oxide, corundum, boron nitride, diamond, chromium oxide, iron oxide, fumed silica, alumina and zeolite.

36. The manufacturing method as claimed in claim 33, wherein said precise chemical mechanical polishing is executed using a slurry with an average particle diameter of 100 nm or less.

37. The manufacturing method as claimed in claim 20, wherein termination of the chemical mechanical polishing is managed by monitoring a polishing process time.

38. The manufacturing method as claimed in claim 20, wherein said magnetoresistive effect multi-layered structure is a tunnel magnetoresistive effect multi-layered structure.

39. The manufacturing method as claimed in claim 20, wherein said magnetoresistive effect multi-layered structure is a current perpendicular to plane type giant magnetoresistive effect multi-layered structure.

\* \* \* \* \*